United States Patent
Komma et al.

(10) Patent No.: US 7,248,409 B2
(45) Date of Patent: *Jul. 24, 2007

(54) OPTICAL ELEMENT, OPTICAL LENS, OPTICAL HEAD APPARATUS, OPTICAL INFORMATION APPARATUS, COMPUTER, OPTICAL INFORMATION MEDIUM PLAYER, CAR NAVIGATION SYSTEM, OPTICAL INFORMATION MEDIUM RECORDER, AND OPTICAL INFORMATION MEDIUM SERVER

(75) Inventors: Yoshiaki Komma, Hirakata (JP); Sadao Mizuno, Ibaraki (JP); Yasuhiro Tanaka, Ashiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/716,990

(22) Filed: Nov. 18, 2003

(65) Prior Publication Data

US 2004/0109242 A1    Jun. 10, 2004

(30) Foreign Application Priority Data

Nov. 25, 2002   (JP)   ............................ 2002-340589

(51) Int. Cl.
   *G02B 5/18* (2006.01)
(52) U.S. Cl. .................. 359/569; 359/15; 369/112.03; 369/112.08
(58) Field of Classification Search ...................... None
   See application file for complete search history.

(56) References Cited

U.S. PATENT DOCUMENTS 5,446,565 A    8/1995   Komma et al. .......... 369/44.23

6,084,843 A    7/2000   Abe et al.
6,118,594 A    9/2000   Maruyama .................. 359/719
6,166,854 A    12/2000  Katsuma (Continued)

FOREIGN PATENT DOCUMENTS

EP    0 610 055    8/1994

(Continued)

OTHER PUBLICATIONS

Katayama et al., "Dual Wavelength Optical Head for 0.6 mm and 1.2 mm Substrate Thickness", Japanese Journal of Applied Physics (1997); 36: 460-466.

(Continued)

*Primary Examiner*—Arnel Lavarias
(74) *Attorney, Agent, or Firm*—Hamre, Schumann, Mueller & Larson, P.C.

(57) ABSTRACT

An optical lens includes a hologram, a refractive lens, and a phase level difference. The hologram has a sawtooth shape grating having a sawtooth shape in cross-section, and generates +2nd-order diffracted light most strongly with respect to blue light and +1st-order diffracted light most strongly with respect to red light, by setting a height of the sawtooth shape grating. The +2nd-order diffracted light of blue light is condensed through a substrate with a thickness t1, and the +1st-diffracted light of red light is condensed through a substrate with a thickness t2 (t1<t2). The difference in optical path length occurring when the blue light passes through the phase level difference is five times the wavelength of the blue light.

43 Claims, 19 Drawing Sheets

U.S. PATENT DOCUMENTS

| | | | |
|---|---|---|---|
| 6,201,780 B1 | 3/2001 | Katayama | 369/112.19 |
| 6,442,124 B1 | 8/2002 | Chung et al. | 369/112.07 |
| 6,449,095 B1 | 9/2002 | Ohtaki et al. | |
| 6,760,295 B1 | 7/2004 | Maruyama | |
| 6,834,036 B1 | 12/2004 | Shiono et al. | |
| 6,898,168 B2 | 5/2005 | Kimura et al. | |
| 6,928,035 B2 * | 8/2005 | Komma et al. | 369/44.37 |
| 6,992,967 B2 | 1/2006 | Jeong | |
| 2001/0000135 A1 | 4/2001 | Mori et al. | |
| 2003/0151996 A1 * | 8/2003 | Hendriks et al. | 369/53.2 |
| 2003/0227858 A1 * | 12/2003 | Komma | 369/112.08 |
| 2004/0170106 A1 * | 9/2004 | Komma | 369/112.1 |
| 2005/0152036 A1 * | 7/2005 | Shiono et al. | 359/569 |
| 2005/0249099 A1 | 11/2005 | Komma | |

FOREIGN PATENT DOCUMENTS

| | | |
|---|---|---|
| EP | 0 731 459 | 9/1996 |
| EP | 0 747 893 | 12/1996 |
| EP | 0 831 466 | 3/1998 |
| EP | 0 936 604 | 8/1999 |
| EP | 1 001 414 | 5/2000 |
| EP | 1 500 956 | 1/2005 |
| JP | 7-098431 | 4/1995 |
| JP | 9-306018 | 11/1997 |
| JP | 10-106016 | 4/1998 |
| JP | 10-334504 | 12/1998 |
| JP | 11-23819 | 1/1999 |
| JP | 11-296890 | 10/1999 |
| JP | 11-339307 | 12/1999 |
| JP | 2000-081566 | 3/2000 |
| JP | 2000-260056 | 9/2000 |
| JP | 2001-6203 | 1/2001 |
| JP | 2001-43559 | 2/2001 |
| JP | 2001-60336 | 3/2001 |
| JP | 2001-93179 | 6/2001 |
| JP | 2001-209966 | 8/2001 |
| JP | 2002-237078 | 8/2002 |
| WO | WO 02/21522 | 3/2002 |
| WO | 02/082437 | 10/2002 |
| WO | WO 03/060891 | 7/2003 |

OTHER PUBLICATIONS

Katayama, R. et al., "BLUE/DVD/DC Compatible Optical Head With Three Wavelengths and a Wavelength Selective Filter", *ISOM 2001 Technical Digest Session We-30-05*, p. 30-31.

Nishioka et al., "BD/DVD/CD Compatible Optical Pick-up Technology", Extend Abstracts (The 50th Spring Meeting 2003); The Japan Society of Applied Physics and Related Societies, 27 p-ZW-10, Kanagawa University, Mar. 2003 (with partial translation).

N. Kaiho, et al., "DVD/CD Compatibility using Blu-ray Disc Pick Up", Extended Abstracts (The 63rd Autumn Meeting, 2002); The Japan of Applied Physics, No. 3, Sep. 2002, 27p-YD-5, pp. 1008 (with partial translation).

European Search Report mailed Sep. 25, 2006 for co-pending EP application 03013076.9.

* cited by examiner

OPTICAL ELEMENT, OPTICAL LENS, OPTICAL HEAD APPARATUS, OPTICAL INFORMATION APPARATUS, COMPUTER, OPTICAL INFORMATION MEDIUM PLAYER, CAR NAVIGATION SYSTEM, OPTICAL INFORMATION MEDIUM RECORDER, AND OPTICAL INFORMATION MEDIUM SERVER

BACKGROUND OF THE INVENTION

1. Field of the Invention

The present invention relates to an optical head apparatus and an optical information apparatus for recording/reproducing or erasing information recorded on an optical information medium such as an optical disk, a recording/reproducing method in an optical information apparatus, and a system adopting them. Furthermore, the present invention relates to an objective lens (optical lens) and a diffraction element used in the optical head apparatus, and a phase difference.

2. Description of the Related Art

An optical memory technique using an optical disk having a pit pattern as a recording medium with high density and high capacity is being widely used for a digital audio disk, a video disk, a document file disk, a data file, and the like, and is being put into practical use. The function of conveniently recording/reproducing information with respect to an optical disk with high reliability through a minutely condensed light beam is classified into a condensing function of forming diffraction-limited minute spots, focus control (focus servo) and tracking control of an optical system, and a pit signal information signal) detection.

Recently, due to the advancement of an optical system design technique and a decreased wavelength of a semiconductor laser used as a light source, an optical disk having a high-density storage capacity larger than that of a conventional example has been developed. As an approach to higher density, an increase in a numerical aperture (NA) on an optical disk side of a condensing optical system that condenses a light beam minutely onto an optical disk has been studied.

In this case, there is a problem that the generated amount of aberration is increased due to the incline (so-called tilt) of an optical axis. When the NA is increased, the amount of aberration occurring with respect to tilt increases. In order to prevent this, the thickness of a substrate (substrate thickness) of an optical disk may be decreased.

A compact disk (CD) that may be called a first-generation optical disk uses infrared light (wavelength $\lambda 3$: 780 nm to 820 nm) and an objective lens with an NA of 0.45, and has a substrate thickness of 1.2 mm. A DVD that is a second-generation optical disk uses infrared light (wavelength $\lambda 2$: 630 nm to 680 nm; standard wavelength: 650 nm) and an objective lens with an NA of 0.6, and has a substrate thickness of 0.6 mm. A third-generation optical disk uses blue light (wavelength $\lambda 1$: 390 nm to 415 nm; standard wavelength: 405 nm) and an objective lens with an NA of 0.85, and has a substrate thickness of 0.1 mm.

In the specification, the substrate thickness refers to a thickness from a surface of an optical disk (or an information medium) upon which a light beam is incident to an information recording surface.

Thus, the substrate of a high-density optical disk is designed to be thin. In view of cost efficiency and an occupied space of an apparatus, there is a demand for an optical information apparatus capable of recording/reproducing information with respect to optical disks that are varied in substrate thickness and recording density. For this purpose, an optical head apparatus is required to be provided with a condensing optical system capable of condensing a light beam up to a diffraction-limited beam onto optical disks having different thicknesses.

Furthermore, in the case of recording/reproducing information with respect to a disk with a thick substrate, it is necessary to condense a light beam onto a recording surface placed on an inner side of a disk surface. Therefore, a focal length must be set to be larger.

In view of the above, a configuration is disclosed, which is intended for compatibly reproducing information from different kinds of optical disks with light beams having a plurality of wavelengths. This will be described with reference to FIG. 20.

In FIG. 20, reference numerals 10 and 11 respectively denote optical disks having a transparent substrate thickness of 0.1 mm (t1) and 0.6 mm (t2). In order to enhance stiffness, a protective substrate is attached to a reverse surface (on an opposite side of an objective lens 40) of a transparent substrate, which is omitted in FIG. 20.

The objective lens 40 includes a refractive lens 402 on one surface 403 of which a layer 401 made of a different material from that of the refractive lens 402 is cemented. The objective lens 40 utilizes the difference in refractive index and dispersion between the refractive lens 402 and the layer 401. The objective lens 40 allows light beams having different wavelengths to be incident. The objective lens has spherical aberration characteristics in which a spherical aberration is changed to an underside when the wavelength of a luminous flux from a light source is shifted toward a long wavelength side. The spherical aberration displaced to the overside is cancelled by the spherical aberration displaced to the underside due to light having a longer wavelength. Thus, compatible recording/reproducing of optical disks having different thicknesses is made possible (see, for example, JP 2002-237078 A (pages 6–7, FIG. 1)).

As a second conventional example, a configuration in which a wavelength selecting phase plate is combined with an objective lens is disclosed. This will be described with references to FIGS. 21 and 22A–22B. FIG. 21 shows a schematic configuration of an optical head apparatus. Collimated light output from a blue light optical system 51 having a blue light source with a wavelength $\lambda 1$ of 405 nm passes through a beam splitter 161 and a wavelength selecting phase plate 205, and is condensed onto an information recording surface of an optical disk 9 (third-generation optical disk) with a substrate thickness of 0.1 mm by an objective lens 50.

The light reflected from the optical disk 9 follows an opposite path to be detected by a detector of the blue light optical system 51. Diffused light output from a red light optical system 52 having a red light source with a wavelength $\lambda 2$ of 650 nm is reflected from the beam splitter 161 and passes through the wavelength selecting phase plate 205, and is condensed onto the information recording surface of an optical disk 10 (second-generation optical disk: DVD) with a substrate thickness of 0.6 mm by the objective lens 50. The light reflected from the optical disk 10 follows an opposite path to be detected by a detector of the red light optical system 152.

The objective lens 50 is designed so as to allow collimated light to pass through the optical disk 9 with a substrate thickness of 0.1 mm to be condensed, when the collimated light is incident, and a spherical aberration occurs due to the difference in substrate thickness during recording/reproducing of a DVD. In order to correct such a spherical aberration, a light beam output from the red light optical system 52 and incident upon the objective lens 50 is formed into diffused light, and the wavelength selecting phase plate 205 is used. When diffused light is incident upon the objective lens 50, a new spherical aberration occurs.

Therefore, the spherical aberration occurring due to the difference in substrate thickness is cancelled with the new spherical aberration, and the wavefront is corrected by the wavelength selecting phase plate 205.

FIG. 22A is a plan view showing the wavelength selecting phase plate 205, and FIG. 22B is a sectional side view thereof. The wavelength selecting phase plate 205 satisfies a relationship: h=λ1/(n1−1) (where λ1 is a wavelength; n1 is a refractive index, and h is a height), and has a phase level difference 205a of h and 3h. The difference in optical path length caused by the height h with respect to light having the wavelength λ1 is a wavelength λ1, corresponding to a phase difference 2π radian, which is the same as a phase difference 0.

Therefore, a phase distribution is not influenced, and recording/reproducing of the optical disk 9 is not influenced. On the other hand, regarding light having the wavelength λ2, assuming that the refractive index of the wavelength selecting phase plate 205 is n2 at the wavelength λ2, h/λ2×(n2−1) is about 0.6 λ (i.e., the difference in optical path length that is not an integral multiple of a wavelength occurs). The above-mentioned aberration correction is performed by using a phase difference due to the difference in optical path length (see, for example, JP 10(1998)-334504 A (pages 7–9, FIGS. 1–4) and ISOM2001TECHINICAL DIGEST Session We-C-05 (page 30 of Preprints)).

Furthermore, as a third conventional example, a configuration is disclosed in which a plurality of objective lenses are switched mechanically. (See, for example, JP11(1999)-296890 A (pages 4–6, FIG. 1)).

Furthermore, as a fourth conventional example, a configuration is disclosed in which a mirror with a reflective surface having different radii of curvature also functions as a mirror for allowing an optical axis to be deflected (See, for example, JP 11(1999)-339307 A (pages 4–5, FIG. 1)).

As a fifth conventional example, a configuration is disclosed in which a refractive objective lens is combined with a hologram in the same way as in the first conventional example, and the difference in substrate thickness is corrected using a chromatic aberration occurring due to diffracted light beams having different wavelengths and the same order (See, for example, JP 2000-81566 A (pages 4–6, FIGS. 1 and 2)).

The first conventional example has spherical aberration characteristics in which a spherical aberration is changed to an underside when the wavelength of a luminous flux from a light source is shifted toward a long wavelength side. The spherical aberration displaced to the overside is cancelled by the spherical aberration displaced to the underside due to light having a longer wavelength.

For example, when reproduction of information is switched to recording of information with respect to an optical disk having a transparent substrate with a thickness t1, the light amount needs to be increased by 10 times. A wavelength is changed to be long accordingly. Since the wavelength becomes longer, the spherical aberration is changed to an underside. However, the thickness of the disk is not changed. Therefore, an unintended spherical aberration occurs and the light condensing ability is degraded.

Furthermore, the change in wavelength due to the change in light amount also changes a focal length. In FIG. 3 of the first conventional example (JP 2002-237078 A), when the wavelength of blue light is changed by 10 nm, the focal length is changed by about 10 μm. In FIG. 4 of the first conventional example, when the wavelength of red light is changed by 10 nm, the focal length is changed by about 3 μm. Particularly, when the focal length of blue light is changed greatly, light condensing characteristics are degraded while an objective lens is moved by focus control immediately after the light amount is changed.

In the second conventional example, a wavelength selecting phase plate is used as a compatible element. When information is recorded/reproduced with respect to a disk having a large substrate thickness, a recording surface is positioned far away from an objective lens by a substrate thickness. Therefore, it is necessary to extend a focal length. The focal length can be extended by allowing the compatible element to have a lens power. The wavelength selecting phase plate has no lens power.

Furthermore, in the case where it is attempted to realize the above-mentioned lens power by forming red light into diffused light as in the second conventional example, a large aberration occurs when the objective lens is moved by tracking or the like, and consequently, recording/reproducing characteristics are degraded.

Furthermore, the collimation degree of light that is reflected from an optical disk and returns through an objective lens is varied depending upon the disk substrate thickness. Therefore, a detection lens and a photodetector cannot be configured as one unit, and they must be prepared separately in accordance with the collimation degree of light.

In the third conventional example, objective lenses are switched. Therefore, a plurality of objective lenses are required, and the number of components is increased. Furthermore, it is difficult to miniaturize an optical head apparatus. It also is difficult to miniaturize an apparatus since a switching mechanism is required.

In the fourth conventional example, an objective lens is driven independently from a mirror (See FIGS. 4–6 of JP 11(1999)-339307 A). However, a light beam is converted from collimated light by a mirror having a radius of curvature as described above. Therefore, when the objective lens is moved by track control, the relative position of the objective lens with respect to an incident light wavefront is changed to cause an aberration, which degrades light condensing characteristics.

Furthermore, the reflective surface of a mirror is composed of a surface with a radius of curvature, i.e., a spherical surface. However, the spherical surface is insufficient for correcting the difference in substrate thickness and the difference in wavelength, and high-order (5th-order or more) aberration cannot be reduced sufficiently.

SUMMARY OF THE INVENTION

Therefore, with the foregoing in mind, it is an object of the present invention to provide an optical element, an optical lens, and an apparatus and a system adopting them, in which compatible reproducing and compatible recording of different kinds of optical disks are provided with a single objective lens, the change in focal length and the occurrence of a spherical aberration are suppressed when the wavelength is changed during switching of a light amount, and information is reproduced/recorded stably. Furthermore, an optical element, an optical lens, and an apparatus and a system adopting them, for recording/reproducing information with respect to a single optical disk, are provided.

In order to achieve the above-mentioned object, an optical element of the present invention is designed for at least two wavelengths of red light and blue light, and includes a phase level difference, wherein a difference in optical path length occurring when the blue light passes through the phase level difference is five times the wavelength of the blue light.

A first optical element of the present invention includes a phase level difference, wherein blue light is condensed by the optical lens through a substrate having a thickness t1, red light is condensed by the optical lens through a substrate having a thickness t2, t1<t2, and a difference in optical path length occurring when the blue light passes through the phase level difference is five times a wavelength of the blue light.

A second optical lens of the present invention includes a hologram, a refractive lens, and a phase level difference. The hologram includes a sawtooth shape grating having a sawtooth shape in cross-section, and generates +2nd-order diffracted light most strongly with respect to blue light and generates +1st-order diffracted light most strongly with respect to red light, by setting a height of the sawtooth shape grating, and a difference in optical path length occurring when the blue light passes through the phase level difference is five times a wavelength of the blue light.

A third optical lens of the present invention includes a hologram, a refractive lens, and a phase level difference, wherein the hologram generates +2nd-order diffracted light most strongly with respect to blue light and generates +1st-order diffracted light most strongly with respect to red light, a hologram grating of the hologram is formed in an inner circumferential portion at least including an intersection with an optical axis of the hologram, +2nd-order diffracted light of the blue light is condensed through a substrate having a thickness t1, and +1st-order diffracted light of the red light passing through the inner circumferential portion is condensed through a substrate having a thickness t2, and t1<t2, and a difference in optical path length occurring when the blue light passes through the phase level difference is five times a wavelength of the blue light.

A first optical head apparatus of the present invention includes: each of the above-mentioned optical lenses; a first laser light source for emitting blue light having a wavelength λ1; a second laser light. source for emitting red light having a wavelength λ2; and a photodetector for receiving a light beam reflected from a recording surface of an optical information medium and outputting an electric signal in accordance with a light amount of the light beam. The optical lens condenses a first light beam from the first laser light source onto a recording surface of a first optical information medium through a substrate having a thickness t1, and condenses a second light beam from the second laser light source onto a recording surface of a second optical information medium through a substrate having a thickness t2, and t1<t2.

An optical information apparatus of the present invention includes: an optical head apparatus including one of the above-mentioned optical lenses and a laser light source; a motor for rotating an optical information medium; and an electric circuit for receiving a signal obtained from the optical head apparatus, and controlling and driving at least one of the motor, the optical lens, and the laser light source based on the signal.

A computer of the present invention includes: either one of the above-mentioned optical information apparatuses; a computation apparatus for performing computation based on at least one of input information and information reproduced by the optical information apparatus; and an output apparatus for outputting at least one of the input information, the information reproduced by the optical information apparatus, and a result obtained by the computation in the computation apparatus.

An optical information medium player of the present invention includes one of the above-mentioned optical information apparatuses, and a decoder for converting an information signal obtained by the optical information apparatus to an image.

A car navigation system of the present invention includes one of the above-mentioned optical information apparatuses, and a decoder for converting an information signal obtained by the optical information apparatus to an image.

An optical information medium recorder of the present invention includes one of the above-mentioned optical information apparatuses, and an encoder for converting image information to information to be recorded by the optical information apparatus.

An optical information medium server of the present invention includes one of the above-mentioned optical information apparatuses, and an input/output terminal for exchanging information with an outside.

A fourth optical lens of the present invention is designed for light having one wavelength and includes a phase level difference, wherein a difference in optical path length occurring when the light passes through the phase level difference is an integral multiple of the wavelength of the light.

A second optical head apparatus of the present invention includes the fourth optical lens; a laser light source for emitting a light beam; and a photodetector for receiving the light beam reflected from a recording surface of an optical information medium and outputting an electric signal in accordance with a light amount of the light beam, wherein the optical lens condenses the light beam from the laser light source onto a recording surface of the optical information medium through a substrate.

These and other advantages of the present invention will become apparent to those skilled in the art upon reading and understanding the following detailed description with reference to the accompanying figures.

DESCRIPTION OF THE PREFERRED EMBODIMENTS

Figure 1:
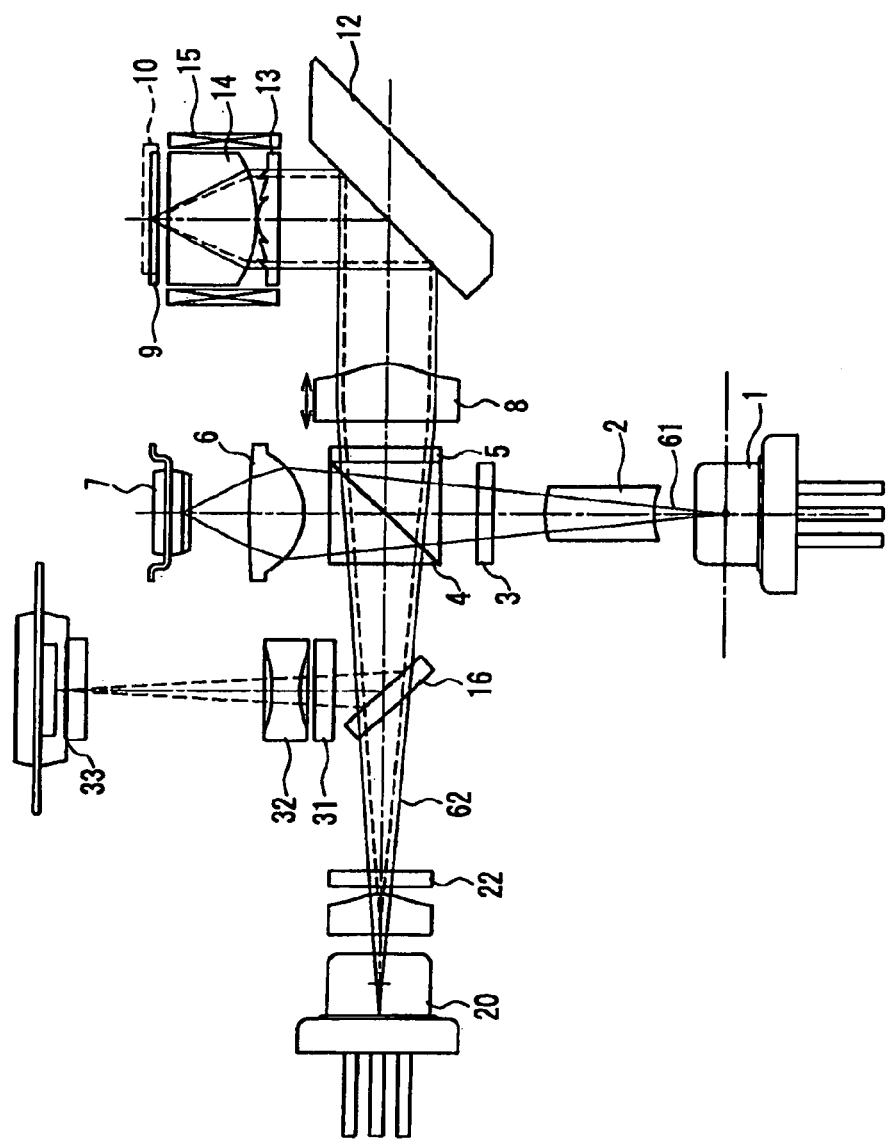
FIG. 1 is a schematic cross-sectional view of an optical head apparatus according to an embodiment of the present invention.

According to the optical element and the first optical lens of the present invention, a spherical aberration due to a chromatic aberration can be corrected by a phase level difference causing a difference in optical path length that is five times the wavelength of blue light. Therefore, information can be recorded/reproduced stably even when a wavelength is varied. According to the present invention, the phase level difference refers to the steps formed in an optical element so as to provide high/low levels, and the steps cause a phase difference in light passing therethrough. This also applies to each invention described below.

According to the second optical lens, +2nd-order diffracted light is generated most strongly with respect to blue light, and +1st-order diffracted light is generated most strongly with respect to red light, whereby a focal position and a spherical aberration due to a difference in substrate thickness can be corrected. Furthermore, a spherical aberration due to a chromatic aberration can be corrected by a phase level difference causing a difference in optical path length that is five times the wavelength of blue light. Therefore, information can be recorded/reproduced stably even when a wavelength is varied.

According to the third optical lens of the present invention, the inner circumferential portion of the hologram is designed so that +2nd-order diffracted light is generated most strongly with respect to blue light, and +2st-order diffracted light is generated most strongly with respect to red light. As a result, the intensity of diffracted light of a red light beam can be maximized, and the light use efficiency of a blue light beam with respect to a condensed spot can be prevented from decreasing. Furthermore, a spherical aberration due to a chromatic aberration can be corrected by a phase level difference causing a difference in optical path length that is five times the wavelength of blue light. Therefore, information can be recorded/reproduced stably even when a wavelength is varied.

According to the fourth optical lens of the present invention, a chromatic aberration can be corrected, and a grating pitch of a diffractive lens can be made rough, so that the light use efficiency can be enhanced.

According to the first optical head apparatus of the present invention, a single optical head apparatus can handle a plurality of optical disks having different recording densities.

The second optical head apparatus of the present invention can be used for an apparatus for recording/reproducing information with respect to a single optical disk.

According to the computer, optical disk player, optical disk recorder, optical disk server, and car navigation system of the present invention, information can be recorded/reproduced stably with respect to different kinds of optical disks. Therefore, these apparatuses can be used in a wide range.

It is preferable that the first optical lens further includes a liquid crystal phase modulation element, wherein the blue light is condensed through the substrate having the thickness t1 and the red light is condensed through the substrate having the thickness t2 by electrically switching the liquid crystal phase modulation element, and an aberration due to a difference in substrate thickness is corrected by switching a phase modulation amount given to a transmission wavefront. According to this configuration, an aberration due to a difference in substrate thickness can be corrected by the liquid crystal phase modulation element without using a hologram.

Furthermore, it is preferable that the above-mentioned optical lens is a refractive lens formed of two kinds of different materials. According to this configuration, the refractive lens has a chromatic aberration correcting function, and this correcting function does not cause loss of a light amount due to diffraction, and can satisfy a high light use efficiency and correction of a chromatic aberration.

In the second optical lens, it is preferable that the height of the sawtooth shape grating is h1, and h1 provides a difference in optical path length of about two wavelengths with respect the blue light. According to this configuration, the intensity of +2nd-order diffracted light becomes highest with respect to blue light, and the intensity of +1st-order diffracted light becomes highest with respect to red light.

Furthermore, it is preferable that, in the hologram, a height of the sawtooth shape grating formed in an inner circumferential portion including an intersection with an optical axis of the hologram is h2, and h2 provides a difference in optical path length of about one wavelength with respect to the red light. According to this configuration, the intensity of diffracted light of a red light beam can be maximized, and the light use efficiency of a blue light beam with respect to a condensed spot can be prevented from decreasing.

In the third optical lens, it is preferable that a hologram grating is further formed in an outer circumferential portion outside of the inner circumferential portion, the hologram grating in the outer circumferential portion is a sawtooth shape grating having a sawtooth shape in cross-section, and a height of the sawtooth shape grating in the outer circumferential portion is h3. h3 provides a difference in optical path length of about one wavelength with respect to the blue light, +1st-order diffracted light is generated most strongly with respect to the blue light and +1st-order diffracted light also is generated most strongly with respect to red light, in the outer circumferential portion. According to this configuration, the numerical aperture NAb at which information is recorded/reproduced with respect to a thin optical disk with a blue light beam can be set to be larger than the numerical aperture NAr at which information is recorded/reproduced with respect to a DVD or the like with a red light beam (NAb>NAr).

Furthermore, in each of the above-mentioned optical lenses, it is preferable that the blue light is condensed through a substrate having a thickness t1, and the hologram is formed into a convex lens type so as to reduce a change in focal length when a wavelength $\lambda1$ of the blue light is changed, whereby the blue light is subjected to a convex lens function by the hologram.

Furthermore, it is preferable that the blue light is condensed through a substrate having a thickness t1 by the optical lens, the red light is condensed through a substrate having a thickness t2, t1<t2, and when the blue light is condensed through the substrate having a thickness t1, a convex lens function of the hologram is increased, compared with a case where the red light is condensed through the substrate having a thickness t2, and a focal position of the red light on the substrate side is placed farther away from the optical lens, compared with a focal position of the blue light on the substrate side.

Furthermore, it is preferable that the blue light is condensed through a substrate having a thickness t1 by the optical lens, the red light is condensed through a substrate having a thickness t2, t1<t2, and when the red light is condensed through the substrate having a thickness t2, a convex lens function of the hologram is decreased, compared with a case where the blue light is condensed through the substrate having a thickness t1, and a focal position of the red light on the substrate side is placed farther away from the optical lens, compared with a focal position of the blue light on the substrate side.

Furthermore, it is preferable that a grating cross-sectional shape of the hologram is a sawtooth shape having an inclined surface on an outer circumferential side of a substrate on which the hologram is formed.

Furthermore, it is preferable that the hologram, the refractive lens, and the phase level difference are fixed integrally. Furthermore, it is preferable that the hologram is integrally formed on a surface of the refractive lens. Furthermore, it is preferable that the phase level difference is integrally formed on a surface of the refractive lens. According to these configurations, a common driving means is used to perform integral driving for focus control and tracking control, whereby an aberration due to a shift of a relative position between the hologram and the objective lens can be prevented from increasing.

Furthermore, it is preferable that an aberration occurring in a refractive lens, or a refractive lens and a hologram due to a change in wavelength is reduced by an aberration occurring in the phase level difference.

Furthermore, assuming that a numerical aperture at which the blue light is condensed through a substrate having a thickness t1 is NAb, and a numerical aperture at which the red light is condensed through a substrate having a thickness t2 is NAr, it is preferable that t1<t2 and NAb>NAr.

In the above-mentioned optical head apparatus, it is preferable that when the second light beam is condensed onto the recording surface of the second optical information medium, a collimator lens for substantially collimating the second light beam is placed close to the second laser light source, whereby the second light beam formed into diffused light is allowed to be incident upon the optical lens, and a focal position on the second optical information medium side is placed away from the optical lens.

Furthermore, it is preferable that both light emission points of the first laser light source and the second laser light source are placed so as to have an image forming relationship with respect to a focal position on the optical information medium side of the optical lens, whereby a servo signal from a common photodetector is detected.

In the optical information apparatus, it is preferable that the laser light source includes a first laser light source for emitting blue light having a wavelength $\lambda1$ and a second laser light source for emitting red light having a wavelength $\lambda2$, the type of the optical information medium is determined, and a collimator lens is moved to the second laser light source with respect to an optical information medium having a substrate thickness of about 0.6 mm.

Hereinafter, the present invention will be described by way of illustrative embodiments with reference to the drawings.

Embodiment 1

FIG. 1 is a schematic cross-sectional view of an optical head apparatus in Embodiment 1 of the present invention. In FIG. 1, reference numeral 1 denotes a blue laser light source that emits blue laser light with a wavelength $\lambda1$ (390 nm to 415 nm: generally, the wavelength $\lambda1$ is about 405 nm, so that the wavelength in a range of 390 nm to 415 nm will be collectively referred to as about 405 nm).

Reference numeral 20 denotes a red laser light source that emits red laser light with a wavelength $\lambda2$ (630 nm to 680 nm: generally, the wavelength $\lambda2$ is about 660 nm, so that the wavelength in a range of 630 nm to 680 nm will be collectively referred to as about 660 nm). Reference numeral 8 denotes a collimator lens (first convex lens), 12 denotes a mirror for allowing an optical axis to be deflected, and 14 denotes an objective lens (optical lens).

Reference numeral 9 denotes a third-generation optical disk corresponding to an optical information medium, which has a substrate thickness t1 of about 0.1 mm or less (hereinafter, the substrate thickness in a range of 0.06 mm to 0.11 mm will be referred to as about 0.1 mm), and with respect to which information is recorded/reproduced with a light beam having the wavelength $\lambda1$. Reference numeral 10 denotes a second-generation optical disk such as a DVD, which has a substrate thickness t2 of about 0.6 mm (the substrate thickness in a range of 0.54 mm to 0.65 mm will be referred to as about 0.6 mm), and with respect to which information is recorded/reproduced with a light beam having the wavelength $\lambda2$.

Regarding the optical disks 9 and 10, only a base from an incident surface of light to a recording surface is shown. Actually, a protective plate is attached to each of the optical disks 9 and 10 so as to enhance mechanical strength and to set an outer size to be 1.2 mm in the same way as in a CD. A protective plate with a thickness of 0.6 mm is attached to the optical disk 10. A protective plate with a thickness of 1.1 mm is attached to the optical disk 9. In the drawings of the present invention, the protective plates are omitted for simplicity.

The blue laser light source 1 and the red laser light source 20 are preferably composed of a semiconductor laser light source. This enables an optical head apparatus and an optical information apparatus using the same to be miniaturized, to be light-weight, and to consume less power.

When information is recorded/reproduced with respect to the optical disk 9 having highest recording density, a blue light beam 61 with the wavelength $\lambda 1$ emitted from the blue laser light source 1 is reflected from a beam splitter 4, and circularly polarized by a ¼ wavelength plate 5. The ¼ wavelength plate 5 is designed so as to function as a ¼ wavelength plate with respect to both the wavelengths $\lambda 1$ and $\lambda 2$.

The circularly polarized light is substantially collimated by the collimator lens 8, and has its optical axis deflected by the mirror 12. Then, the collimated light is condensed onto an information recording surface through a substrate with a thickness of about 0.1 mm of the optical disk 9 by a hologram (diffraction type optical element) 13 and a refractive objective lens 14.

The blue light beam 61 reflected from the information recording surface of the optical disk 9 follows an opposite path (return path) to be linearly polarized light in a direction orthogonal to the initial direction by the ¼ wavelength plate 5. The linearly polarized light substantially entirely passes through the beam splitter 4. Then, the linearly polarized light is totally reflected from a beam splitter 16, and diffracted by a detection hologram 31. Furthermore, the linearly polarized light has its focal length to be extended by a detection lens 32 to be incident upon a photodetector 33.

By computing an output of the photodetector 33, a servo signal used for focus control and tracking control and an information signal are obtained. As described above, the beam splitter 4 is a polarized light separating film that totally reflects linearly polarized light in one direction and totally transmits linearly polarized light in a direction orthogonal to the above direction, with respect to a light beam having the wavelength $\lambda 1$. Furthermore, as described later, the beam splitter 4 totally transmits a red light beam 62 emitted from the red laser light source 20 with respect to a light beam having the wavelength $\lambda 2$. Thus, the beam splitter 4 is an optical path separating element that has polarization characteristics and wavelength selectivity.

Next, when information is recorded/reproduced with respect to the optical disk 10, substantially linearly polarized light having the wavelength $\lambda 2$ emitted from the red laser light source 20 passes through the beam splitters 16 and 4, and is substantially collimated by the collimator lens 8. Furthermore, the collimated light has its optical axis deflected by the mirror 12. The resultant collimated light is condensed onto the information recording surface of the optical disk 10 through a substrate with a thickness of about 0.6 mm by the hologram 13 and the objective lens 14.

The light beam reflected from the information recording surface of the optical disk 10 follows an original optical path (return path), and substantially totally passes through the beam splitter 4. Then, the light beam is totally reflected from the beam splitter 16 and diffracted by the detection hologram 31. Furthermore, the light beam has its focal length extended by the detection lens 32 to be incident upon the photodetector 33.

By computing an output of the photodetector 33, a servo signal used for focus control and tracking control, and an information signal are obtained. Thus, in order to obtain a servo signal of the optical disks 9 and 10 from the common photodetector 33, the blue light laser source 1 and the red light laser source 20 are placed so that their light emission points have an image forming relationship with respect to the common position on the objective lens 14 side. This can reduce the number of detectors and wirings.

The beam splitter 16 is a polarized light separating film that totally transmits light linearly polarized in one direction and totally reflects light linearly polarized in a direction orthogonal to the above direction, with respect to a light beam having the wavelength $\lambda 2$. Furthermore, the beam splitter 16 totally reflects the blue light beam 61 with respect to a light beam having the wavelength $\lambda 1$. Thus, the beam splitter 16 also is an optical path separating element having polarization characteristics and wavelength selectivity.

Figure 2:
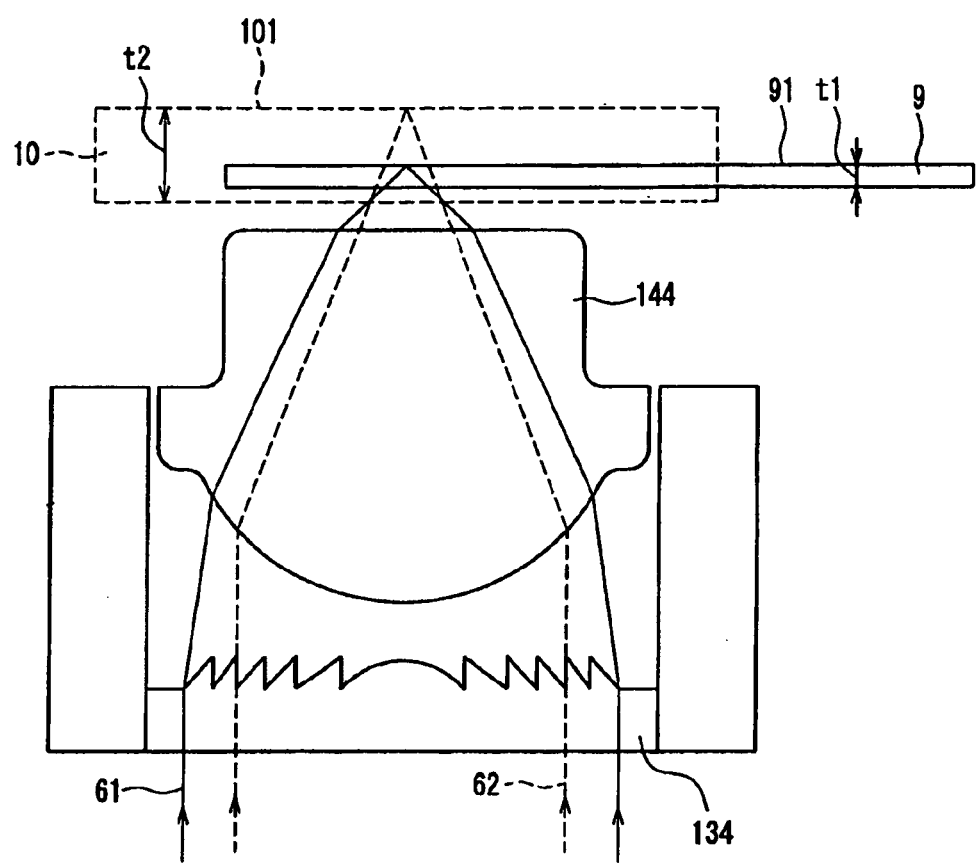
FIG. 2 is a schematic cross-sectional view showing main portions of an optical head apparatus according to an embodiment of the present invention.

Hereinafter, the function and configuration of a hologram 134 and an objective lens 144 will be described with reference to FIGS. 2, 3A–3B, and 4A–4C. In FIG. 2, reference numeral 134 denotes a hologram. The hologram 134 diffracts the blue light beam 61 with the wavelength $\lambda 1$ to exert a convex lens function, and diffracts light with the wavelength $\lambda 2$ to exert a weaker convex lens function compared with that for the blue light beam, as described later.

Herein, the lowest-order diffraction that exhibits a convex lens function is defined as +1st-order diffraction. As the order is increased from +1st-order diffraction, a diffraction angle also is increased. The present embodiment is designed so that +2nd-order diffraction occurs most strongly with respect to a blue light beam. At this time, +1st-order diffraction occurs most strongly with respect to a red light beam. In this case, although the wavelength of the red light beam is larger than that of the blue light beam, a diffraction angle at each point of the hologram 134 is decreased.

More specifically, the convex lens function obtained when the hologram 134 diffracts the blue light beam 61 having the wavelength $\lambda 1$ is stronger than the convex lens function with respect to the light having the wavelength $\lambda 2$. In other words, the red light beam is subjected to the convex lens function by the hologram 134; however, based on the function given to the blue light beam, the red light beam is subjected to a relative concave lens function by diffraction.

The objective lens 144 is designed in such a manner that the blue light beam having the wavelength $\lambda$ is subjected to +2nd-order diffraction by the hologram 134 to receive a convex lens function, and then, the blue light beam is further condensed onto a recording surface 91 through a substrate thickness ti of the optical disk 9.

Next, the function of the hologram 134 for recording/reproducing information with respect to the optical disk 10 using a red light beam will be described in detail. The hologram 134 subjects light (dotted line: red light beam 62) having the wavelength $\lambda 2$ to +1st-order diffraction to exhibit a convex lens function. Then, the objective lens 144 condenses the red light beam 62 onto an information recording surface 101 through a substrate with a thickness t2 of about 0.6 mm of the optical disk 10.

Herein, the disk 10 is thick (substrate thickness from the light incident surface to the information recording surface 101 is 0.6 mm). Thus, it is necessary to place the focal position away from the objective lens 144, compared with the focal position in the case of recording/reproducing information with respect to the optical disk 9 having a substrate thickness of 0.1 mm. The blue light beam 61 is condensed by wavefront conversion, and the condensed degree of the red light beam 62 is alleviated compared with that of the blue light beam, as shown in FIG. 2, whereby a spherical aberration due to the focal position correction and the difference in substrate thickness is corrected. The blue light beam 61 with the wavelength λ1 and the red light beam 62 with the wavelength λ2 are subjected to wavefront conversion by the hologram 134.

Thus, if there is an error in a relative position between the hologram 134 and the objective lens 144, the wavefront as designed is not incident upon the objective lens 144, and an aberration occurs in the wavefront incident upon the optical disk 9 or 10, which degrades light condensing characteristics. It is desirable that the hologram 134 is integrated with the objective lens 144, and they are driven integrally by a common driving means 15 (FIG. 1) for focus control and tracking control.

Figures 3A, 3B:
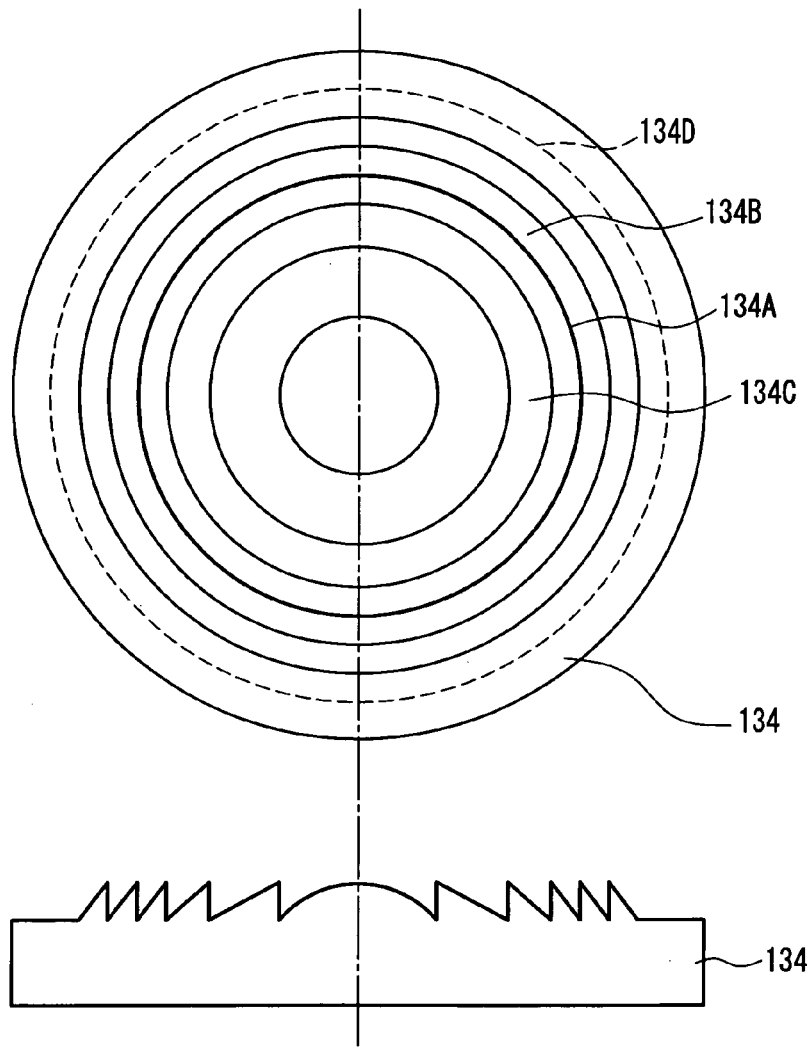
FIG. 3A is a plan view of a hologram according to an embodiment of the present invention.
FIG. 3B is a cross-sectional view thereof.

FIGS. 3A and 3B show the hologram 134. FIG. 3A is a plan view, and FIG. 3B is a cross-sectional view similar to FIG. 2, which is seen in a direction orthogonal to the plan view. In the hologram 134, an inner side (inner circumferential portion 134C) of an inner/outer circumferential border 134A, and an outer side (outer circumferential portion 134B between the inner/outer circumferential border 134A and an effective range 134D) thereof are different from each other.

The inner circumferential portion 134C is a region including an intersection between the hologram 134 and the optical axis (i.e., the center).

This region is used for recording/reproducing information with respect to the optical disk 9 using a blue light beam, as well as for recording/reproducing information with respect to the optical disk 10 using a red light beam.

Thus, the diffraction grating of the inner circumferential portion 134C and the portion of the objective lens 144 through which the red light beam diffracted from the diffraction grating passes are designed so that the +2nd-order diffracted light of the blue light beam is condensed onto the optical disk 9, and the +1-order diffracted light of the red light beam is condensed onto the optical disk 10. In the outer circumferential portion 134B, it is required that a numerical aperture NAb for recording/reproducing information with respect to the optical disk 9 with the blue light beam 61 is larger than a numerical aperture NAr for recording/reproducing information with respect to the optical disk 10 with the red light beam 62 (NAb>NAr).

Therefore, it is necessary to provide an outer circumferential portion 134B on the periphery of an inner circumferential portion for condensing the red light beam 62 and the blue light beam 61 onto the optical disks 9 and 10 corresponding thereto, and to provide an outer circumferential portion of the objective lens 144 corresponding to the outer circumferential portion 134B, in such a manner that only the +2nd-order diffracted light, for example, of the blue light beam 61 is condensed onto the optical disk 9, and the +1st-order diffracted light of the red light beam 62 has an aberration with respect to the optical disk 10.

More specifically, although not shown, it is desirable that the objective lens 144 also is designed so as to be varied between an inner circumference and an outer circumference in the same way as in the hologram 134. This can realize an optimum NA, i.e., NAb>NAr.

Figure 4A:
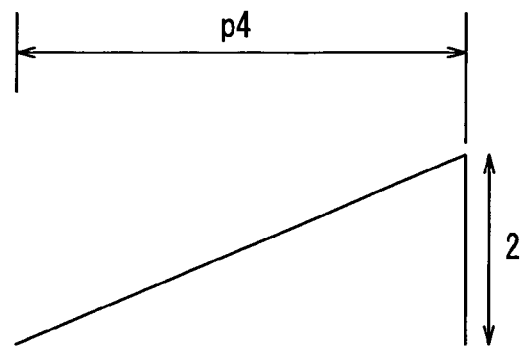
FIG. 4A is a schematic cross-sectional view showing main portions of a diffraction grating according to an embodiment of the present invention.
Figure 4B:
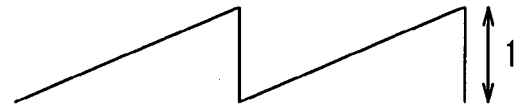
FIGS. 4B and 4C illustrate a phase change.
Figure 4C:

FIGS. 4A–4C illustrate a cross-section of a hologram grating of the hologram 134 in one period (p4). FIG. 4A shows a physical shape. The shape like a sawtooth as shown in FIGS. 4A–4C will be referred to as a sawtooth shape. Furthermore, in order to represent the direction of an inclined surface, the shape shown in FIG. 4A will be expressed as a shape with a surface inclined leftward.

In accordance with the above naming, the cross-sectional shape of the hologram 134 shown in FIG. 3 is expressed as a sawtooth shape with a substrate having a surface inclined toward an outer circumferential side. FIG. 4B shows a phase modulation amount with respect to blue light. FIG. 4C shows a phase modulation amount with respect to red light.

In FIG. 4A, the vertical direction represents a height of a sawtooth shape grating. Assuming that a hologram material is, for example, BK7, a refractive index nb of the hologram material with respect to the blue light beam is nb=1.5302.

The height of the sawtooth shape grating is set so that the difference in optical path length is about 2-wavelength with respect to the blue light beam 61, i.e., a phase difference is about 4π radian. Herein, the difference in optical path length refers to a difference in optical path length (also referred to as an optical distance, which is a value obtained by multiplying the length of a medium by a refractive index) caused by the presence/absence of steps.

A difference L in an optical path length is represented by a product of a height h1 of a step and a difference (nb−1) in refractive index between a medium and air as follows:

$$L = h1 \times (nb-1)$$

In the case where the difference in optical path length is 2-wavelength, L=2λ1, and the height h1 is represented by the following expression. λ1=405 nm and nb=1.5302 are substituted into the expression, whereby the value of h1 is obtained.

$$h1 = 2 \times \lambda 1/(nb-1) = 1.53 \; \mu m$$

The phase modulation amount with respect to blue light due to this shape is changed by 4π (=2π×2) radian in a grating in one period. Therefore, the intensity of +2nd-order diffracted light becomes highest, which corresponds to a 100% diffraction efficiency in terms of a scalar calculation.

On the other hand, assuming that the refractive index of a hologram material with respect to the red light beam 62 is nr, in the case where the hologram material is BK7, nr is 1.5142. The difference in optical path length occurring in a red light beam due to the level difference with the height h1 is represented by h1×(nr−1). Thus, λ1=405 nm and nr=1.5142 are substituted into this expression, whereby the multiple of the difference in optical path length with respect to the wavelength λ2 of the red light beam is as follows.

$$h1 \times (nr-1)/\lambda 2 = 1.19$$

More specifically, the difference in optical path length is about 1.2 times the wavelength λ2, and the phase modulation amount is about 2.4πradian (1.2×2π). Thus, the intensity of +1st-order diffracted light becomes highest, and a diffraction efficiency in terms of calculation is about 80%.

Therefore, when the shape of a grating in one period is set to be a sawtooth cross-sectional shape with a height h1, as shown in FIG. 4A, since +2nd-order diffraction becomes highest in the blue light beam 61 as described above, the grating period determining a diffraction angle is substantially p4/2, and a phase change is equal to that shown in FIG. 4B. Since +1st-order diffraction is highest in the red light beam 62, the grating period determining a diffraction angle is substantially p4.

According to the above configuration, different kinds of disks can be used compatibly due to the correction of a difference in substrate thickness, and the wavelength dependence of a chromatic aberration, in particular, a focal length, with respect to a change in wavelength in the vicinity of a standard wavelength such as 405 nm and 660 nm (within several nm) can be cancelled and reduced. However, a spherical aberration is varied due to the difference in wavelength, so that a spherical aberration among a chromatic aberration is changed with respect to a change in wavelength in the vicinity of a standard wavelength (within several nm). The configuration for correcting the change in spherical aberration will be described with reference to FIGS. 5 and 6.

Figure 5:
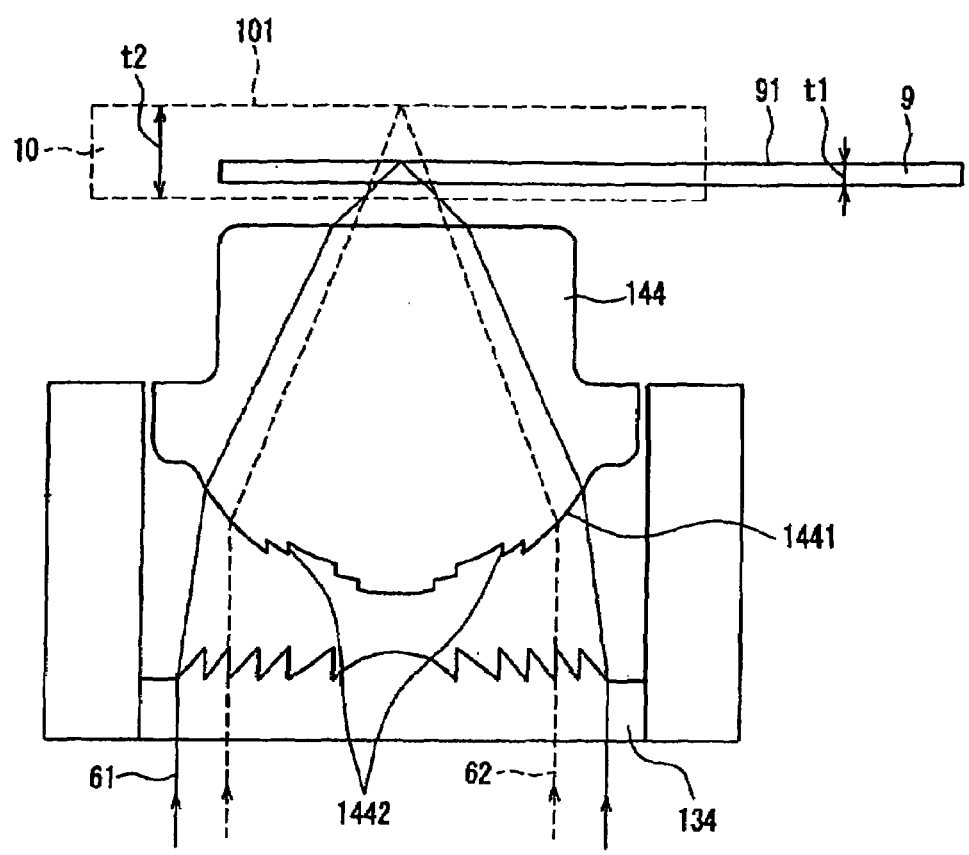
FIG. 5 is a schematic cross-sectional view showing main portions of an optical head apparatus according to an embodiment of the present invention.

In FIG. 5, reference numeral 144 denotes an objective lens, 1441 denotes a surface (first surface) of the objective lens 144 that is not directly opposed to an optical disk, and 1442 denotes a phase level difference formed on the first surface 1441. The phase level difference 1442 also may be formed on a surface (second surface) on an opposite side of the first surface 1441, or any surface of the hologram 134.

Furthermore, as shown in FIG. 5, by integrating the phase level difference 1442 with the objective lens 144, even when the objective lens 144 is moved by tracking or the like, the relative position between the phase level difference 1442 and the objective lens 144 is not changed, so that optical performance is not degraded.

Furthermore, in the case where the degradation of characteristics due to the change in relative position between the phase level difference 1442 and the objective lens 144 is sufficiently small, the objective lens 144 is not integrated with the phase level difference 1442, and also may be formed on the surface of the collimator lens 8 shown in FIG. 1. Furthermore, although not shown, the hologram 134 and the phase level difference 1442 may be formed integrally on the surface of a refractive objective lens.

Figure 6:
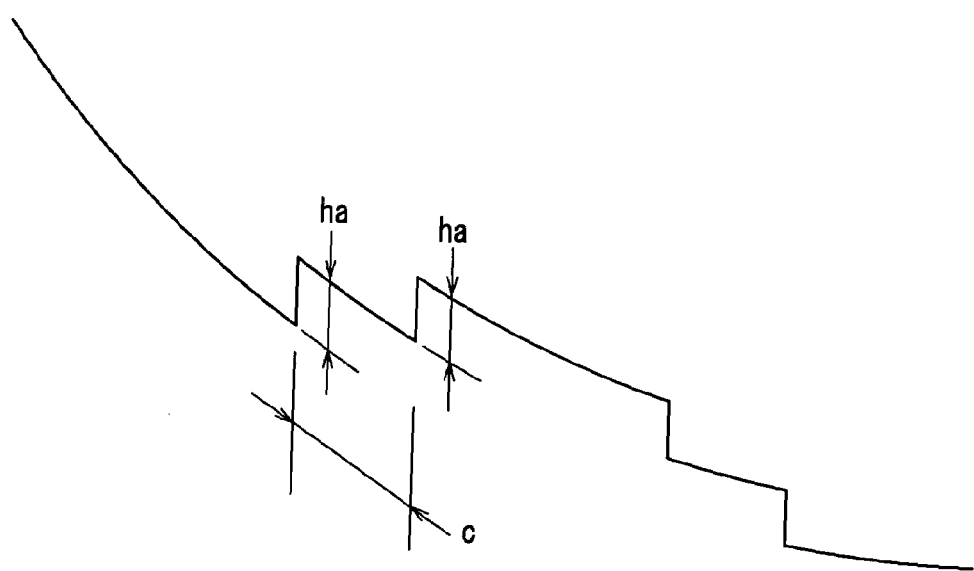
FIG. 6 is a schematic cross-sectional view showing an enlarged main portion of a phase level difference shown in FIG. 5.

FIG. 6 is an enlarged schematic view showing a phase level difference 1442. At least one step with a height ha per step is formed. Assuming that a refractive index nb of a substrate forming the phase level difference 1442 is a refractive index with respect to a wavelength $\lambda 1$ (e.g., 405 nm), the height ha satisfies the following Expression (1):

$$ha = 5 \times \lambda 1/(nb-1) \quad (1)$$

Expression (1) can be modified as follows:

$$5 \times \lambda 1 = ha \times (nb-1) \quad (2)$$

The right side of Expression (2) is a difference in optical path length due to the steps having a height ha. That is, one step of the phase level difference 1442 is set so as to generate a difference in optical path length that is five times the wavelength $\lambda 1$, i.e., a phase difference of $10\pi$ radian $(5 \times 2\pi)$, with respect to light having the wavelength $\lambda 1$.

For example, when the material forming the phase level difference 1442 is glass called BK7, nb=1.5302 when $\lambda 1$=405 nm, and ha=3819 nm from Expression 1. When, red light having a wavelength $\lambda 2$ of 655 nm is incident upon the steps, the refractive index nr of BK7 with respect to $\lambda 2$=655 nm is 1.5144. Therefore, a difference L in an optical path length is generated as follows:

$$L = ha \times (nr-1) = 1964.5$$

This calculated value is substantially equal to $3 \times \lambda 2$. More specifically, the steps causing a difference in optical path length that is 5 times the wavelength with respect to blue light cause a difference in optical path length that is three times the wavelength with respect to red light. A phase change amount causing a difference in optical path length that is an integral multiple of wavelength is an integral multiple of $2\pi$ radian ($10\pi$ radian with respect to $\lambda 1$=405 nm; $6\pi$ radian with respect to $\lambda 2$=655 nm). Therefore, substantially no phase difference is caused.

Thus, a wavefront is not changed with respect to the standard wavelengths $\lambda 1$ and $\lambda 2$. When a wavelength is changed from a standard wavelength, for example, by several nm, the difference in optical path length is shifted from the integral multiple of the wavelength. Therefore, a phase is changed. Steps can be engraved on the substrate side as shown in FIG. 6, or can be mounted thereon. Therefore, the direction of a phase change with respect to a wavelength shift can be set freely. For example, in the case of blue light, a phase change amount $\Delta\phi B$ with respect to a change of a wavelength by 1 nm is $\Delta\phi B = 10 \pi/405 = 0.024 \pi$ (radian). By stacking steps with a height ha at each position where a chromatic aberration per change of a wavelength of 1 nm caused by a lens or a hologram is $0.024 \pi$ radian, an aberration can be corrected. Furthermore, a phase change amount $\Delta\phi R$ with respect to a change of a wavelength by 1 nm is $\Delta\phi R = 6 \pi/655 = 0.009 \pi$ (radian), with respect to red light. The phase change amount is smaller in red light than in blue light. However, a chromatic aberration per change of a wavelength of 1 nm caused by a lens and a hologram also is small. Therefore, there is no problem.

In the above, 405 nm and 655 nm are selected as standard wavelengths for blue light and red light, respectively. As the standard wavelength of blue light, another wavelength such as 408 nm and 410 nm may be selected. The height ha and the standard wavelength of red light may be changed accordingly. The relationship thereof is represented as follows:

$$ha = 3\lambda 2/(n2-1) = 5 \times \lambda 1/(n1-1) \quad (3)$$

One unit of the phase level difference is ha; however, even if the integral multiple thereof (twice, three times, . . . ) is used as one unit, a wavefront is not changed with respect to the standard wavelengths for red light and blue light, and a wavefront can be changed only with respect to a change in wavelength from each of red light and blue light.

Furthermore, the steps causing a difference in optical path length that is five times the wavelength with respect to blue light are applied to a first conventional example, whereby a chromatic aberration due to a change in wavelength may be corrected. In this configuration, the phase steps are formed on an objective lens formed of two kinds of materials. According to this configuration, the chromatic aberration correcting function due to a refractive lens does not cause loss of a light amount due to diffraction, and can satisfy a high light use efficiency and a chromatic aberration correction.

Furthermore, a change in focus point due to a change in wavelength can be corrected in principle. However, this increases the number of steps, and shortens the length (portion with the same height in a direction along a luminous flux, for example, the length of c in FIG. 6) of a flat portion per step, making it difficult to produce the steps as designed. Thus, as shown in FIG. 5, a change in focal length due to a substrate thickness and a chromatic aberration is corrected by the hologram described with reference to FIGS. 2 to 4A–C, and a spherical aberration due to a chromatic aberration is corrected by the steps causing a difference in optical path length that is five times the wavelength with respect to blue light. This configuration results in easy production and performance as designed.

Neither of the above-mentioned conventional examples disclose the concept as described in the present embodiment: using a hologram having a sawtooth cross-sectional shape with a height that generates a difference in optical path length that is twice the wavelength and causes +2nd-order diffraction with respect to blue light, different kinds of disks are used compatibly with +1st-order diffracted light of a red light beam, and a spherical aberration due to a chromatic aberration is corrected by the steps causing a difference in optical path length that is five times the wavelength with respect to blue light.

In the present embodiment, due to the above-mentioned configuration, different kinds of disks can be used compatibly. Furthermore, the hologram 134 has a convex lens function with respect to both a blue light beam and a red light beam. Furthermore, since the color diffusion of the diffraction function is in an opposite direction to that of the refraction function. Therefore, when the hologram 134 is combined with the objective lens 144 that is a refractive convex lens, the wavelength dependence of a color aberration, in particular, a focal length with respect to a change in wavelength by several nm can be cancelled and reduced. Furthermore, a spherical aberration due to a color aberration also can be corrected, and hence, information can be recorded/reproduced stably even when a wavelength is varied.

Thus, with only the hologram 134 and the phase level difference, the problems involved in compatibility of different kinds of disks and the correction of a chromatic aberration can be solved. More specifically, a change in wavelength due to an instant transition from reproducing to recording can be handled rapidly without using focus control of an objective lens that is not suitable for an instant response.

Figure 7:
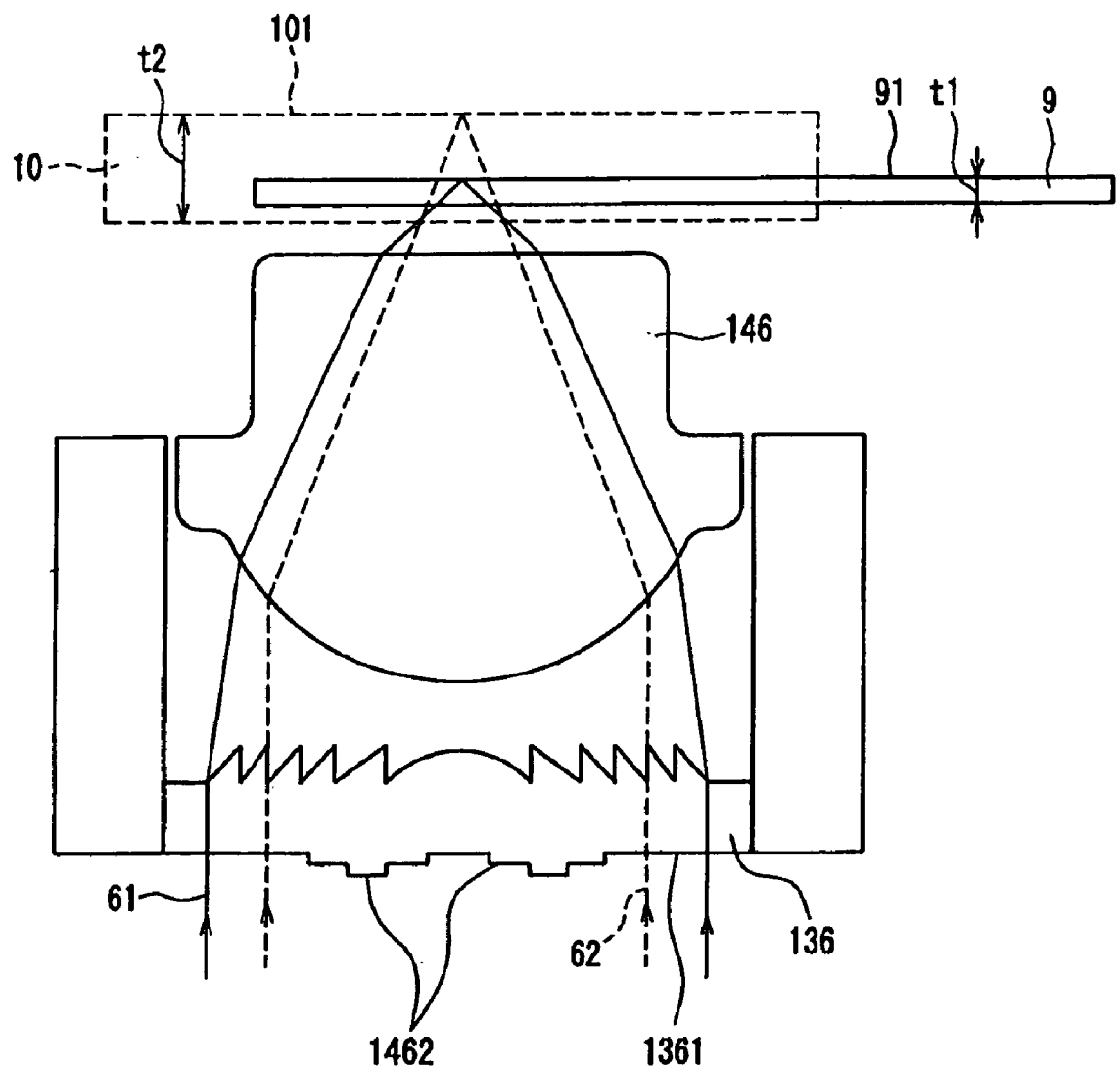
FIG. 7 is a schematic cross-sectional view showing main portions of an optical head apparatus according to an embodiment of the present invention.
Figure 8:
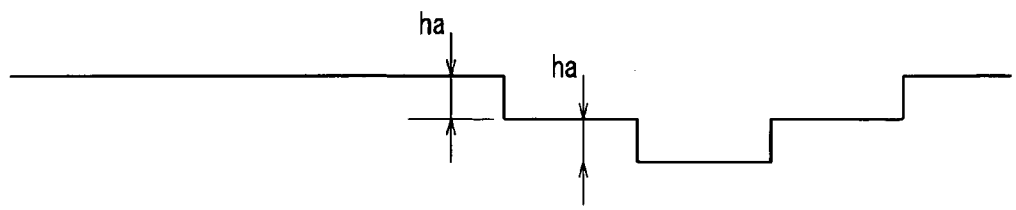
FIG. 8 is a schematic cross-sectional view showing an enlarged main portion of a phase level difference according to an embodiment of the present invention.

In FIGS. 5 and 6, the phase level difference 1442 is formed on the surface 1441 of the objective lens (refractive lens) 144. However, a phase level difference 1462 also may be formed on the substrate surface 1361 of a hologram 136 as shown in FIG. 7. An enlarged view of the phase level difference portion is shown in FIG. 8. FIG. 8 is the same as FIG. 6 in that the step of the phase level difference is set to be an integral multiple of the height ha causing a difference in optical path length that is five times the wavelength with respect to blue light. The phase level difference according to the present embodiment may be added to an optical element or an optical lens such as an objective lens and a hologram, and a phase level difference itself may be formed as an independent optical element. This also applies to the following embodiment.

Furthermore, as an entire configuration of an optical head apparatus, an effective exemplary configuration additionally will be described below. The following description is effective for the entire embodiment. It should be noted that the important point of the present application lies in the steps causing a difference in optical path length that is five times the wavelength with respect to blue light, and the objective lens and hologram to be used in combination with the steps. Therefore, the beam splitter, the detection lens, and the detection hologram that have been described, as well as the following configuration, are not necessarily required. Each of these components has an effect in a preferable configuration; however, other configurations also can be used appropriately.

In FIG. 1, it also is possible that a tracking error signal of the optical disk 9 is detected by a well-known differential push-pull (DPP) method by placing a 3-beam grating (diffraction element) 3 between the blue laser light source 1 and the beam splitter 4.

Furthermore, assuming that two directions orthogonal to an optical axis are an x-direction and a y-direction, for example, a beam shaping element 2 that enlarges only the x-direction is placed between the blue laser light 1 and the beam splitter 4, whereby a far-field pattern of the blue light beam 61 can be approximated to an intensity distribution close to a point symmetry with respect to the optical axis, and hence, a light use efficiency can be enhanced. The beam shaping element 2 can be configured using a double-sided cylindrical lens or the like.

It also is possible that a tracking error signal of the optical disk 10 is detected by a well-known differential push-pull DPP) method by placing a 3-beam grating (diffraction element) 22 between the red laser light source 20 and the beam splitter 16.

It also is effective to change the parallel degree of a light beam by moving the collimator lens 8 in an optical axis direction (horizontal direction in FIG. 1). If there are a substrate thickness error and a substrate thickness ascribed to the interlayer thickness in the case where the optical disk 9 is a two-layered disk, a spherical aberration occurs. However, the spherical aberration can be corrected by moving the collimator lens 8 in an optical axis direction. Thus, by moving the collimator lens 8, the spherical aberration can be corrected by about several 100 m$\lambda$ in the case where the NA of condensed light with respect to an optical disk is 0.85, and a substrate thickness of ±30 µm can be amended. However, when information is recorded/reproduced with respect to a DVD, using the objective lens 14 designed for a substrate thickness of 0.1 mm, it is necessary to compensate for a difference in substrate thickness of 0.5 mm or more. In this case, only the movement of the collimator lens 8 is insufficient, and wavefront conversion using the hologram 13 (134, for example) is required. By moving the collimator lens 8 to the left side in FIG. 1 i.e., to the side close to the red laser light source 20), in the case of recording/reproducing information with respect to the optical disk 10, using a red light beam, the red light beam traveling to the objective lens 14 is formed into diffused light, a condensed light spot with respect to the optical disk 10 is positioned away from the objective lens 14, a part of an aberration due to a substrate thickness is corrected, a hologram pitch is enlarged by reducing the aberration correction amount required in the hologram 13, and the hologram 13 can be created easily.

Furthermore, by allowing the beam splitter 4 to transmit a part (e.g., about 10%) of linearly polarized light emitted from the blue laser light source 1, and allowing a condensing lens 6 to guide the transmitted light to a photodetector 7, a change in light amount emitted from the blue laser light source 1 is monitored by using a signal obtained from the photodetector 7, and the change in light amount is fed back so as to control the light amount emitted from the blue laser light source 1 to be constant.

Furthermore, by allowing the beam splitter 4 to reflect a part (e.g., about 10%) of linearly polarized light emitted from the red laser light source 1, and allowing the condensing lens 6 to guide the reflected light to a photodetector 7, a change in light amount emitted from the red laser light source 20 is monitored by using a signal obtained from the photodetector 7, and the change in light amount is fed back so as to control the light amount emitted from the red laser light source 20 to be constant.

Embodiment 2

Figure 9A:
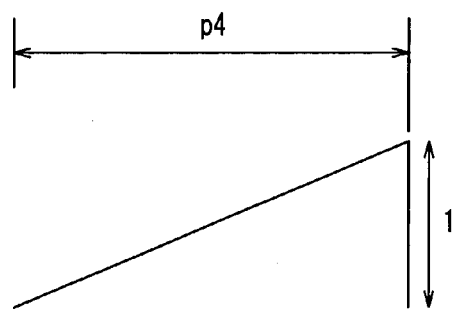
FIG. 9A is a schematic cross-sectional view showing main portions of a diffraction grating according an embodiment of the present invention.
Figure 9B:
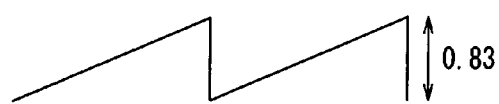
FIGS. 9B and 9C illustrate a phase change.
Figure 9C:

Next, Embodiment 2 of the present invention will be described. Embodiment 2 is the same as Embodiment 1, except that a cross-sectional shape of a grating in the inner circumferential portion 134C of the hologram 134 is changed. FIGS. 9A–9C illustrate a cross-sectional shape of a grating in one period in the inner circumferential portion 134C of the hologram 134 described in Embodiment 1. FIG. 9A shows a physical shape. FIG. 9B shows a phase modulation amount with respect to blue light. FIG. 9C shows a phase modulation amount with respect to red light.

In FIG. 9A, a vertical direction represents a height of a sawtooth shape grating. Unlike FIGS. 4A–4C, the height is determined based on a red light beam. Assuming that a hologram material is, for example, BK7, the refractive index nr of the hologram material with respect to a red light beam is 1.5142, with respect to a wavelength $\lambda 2$ of 660 nm.

The height of the sawtooth shape grating is set so that the difference in optical path length is about one wavelength with respect to a red light beam (i.e., the phase difference is about $2\pi$ radian). In this case, a height h2 is represented as follows: $h2=\lambda 2/(nr-1)=1.28$ $\lambda$m.

On the other hand, assuming that the refractive index of a hologram material with respect to a blue light beam is nh, in the case where the hologram material is BK7, nb=1.5302. The difference in optical path length occurring in a red light beam due to the height h2 of the sawtooth shape grating is represented by $h1\times(nr-1)$. Thus, when $\lambda 1=405$ nm and nb=1.5302 are substituted into the following expression, the multiple of the difference in optical path length with respect to the wavelength $\lambda 1$ of a blue light beam is as follows:

$$h2\times(nb-1)/\lambda 1=1.68$$

More specifically, the difference in optical path length becomes about 1.7 times the wavelength $\lambda 1$, and the phase modulation amount becomes about $3.35\pi$ radian. Therefore, the intensity of +2nd-order diffracted light becomes highest, which corresponds to a diffraction efficiency of about 80% in terms of scalar calculation.

As shown in FIG. 9A, when the shape of a grating in one period is set to be a sawtooth cross-sectional shape with a height h2, since +2nd-order diffraction is highest in the blue light beam as described above, the grating period determining a diffraction angle is substantially p4/2, and a phase change is equal to that shown in FIG. 9B. Since +1st-order diffraction is highest in the red light beam, which corresponds to a grating efficiency of 100% in terms of calculation, a light use efficiency can be enhanced.

Furthermore, the diffraction efficiency of blue diffracted light decreases to about 80%. However, when the light amount at the center portion decreases, the light amount in the outer circumferential portion increases relatively. The intensity of a far-field pattern of a semiconductor laser light source is lower in an outer circumferential portion, and only a part thereof is used. However, when the light amount in an inner circumferential portion decreases, a wider range of the far-field pattern can be used, so that a light use efficiency can be enhanced. This can be realized by shortening a focal length of the collimator lens 8, which can compensate for a decrease in a light amount in the inner circumferential portion. Thus, the effects of the present invention can be obtained as follows: the inner circumferential portion is set to have a height of h2 as described with reference to FIG. 9A, whereby the intensity of diffracted light of a red light beam is maximized, and at this time, the light use efficiency of a blue light beam with respect to a condensed spot is not decreased.

A spherical aberration due to a chromatic aberration can be corrected in combination with the steps causing a difference in optical path length that is five times the wavelength with respect to blue light in the same way as in Embodiment 1.

In the present embodiment, the hologram 134 also has a convex lens function with respect to a blue light beam and a red light beam. The color dispersion of the diffraction function is opposite to that of the refraction function. Therefore, when the hologram 134 is combined with the objective lens 144 that is a refractive convex lens, the wavelength dependence of a chromatic aberration, in particular a focal length with respect to a wavelength change within several nm, can be cancelled and reduced.

When the hologram 134 is combined with the steps causing a difference in optical path length that is five times the wavelength with respect to blue light, the problems involved in compatibility of different kinds of disks and the correction of a chromatic aberration can be solved.

Furthermore, a lens with a high NA is very difficult to produce. However, by allowing the hologram to have a convex lens function, the production of the refractive objective lens 144 to be combined can be made easier.

Furthermore, as an entire configuration of the optical head apparatus, it also is possible to combine the configuration that has been additionally described in Embodiment 1.

Embodiment 3

Embodiment 3 of the present invention will be described. In the same way as in Embodiments 1 and 2, an exemplary entire configuration of an optical head apparatus of Embodiment 3 is shown in FIG. 1. The configuration of a hologram in Embodiment 3 is different from that shown in FIG. 1, so that the function and configuration of a hologram that is a characteristic element in Embodiment 3 will be described with reference to FIGS. 10, 11A–11B, and 12A–12C.

Figure 10:
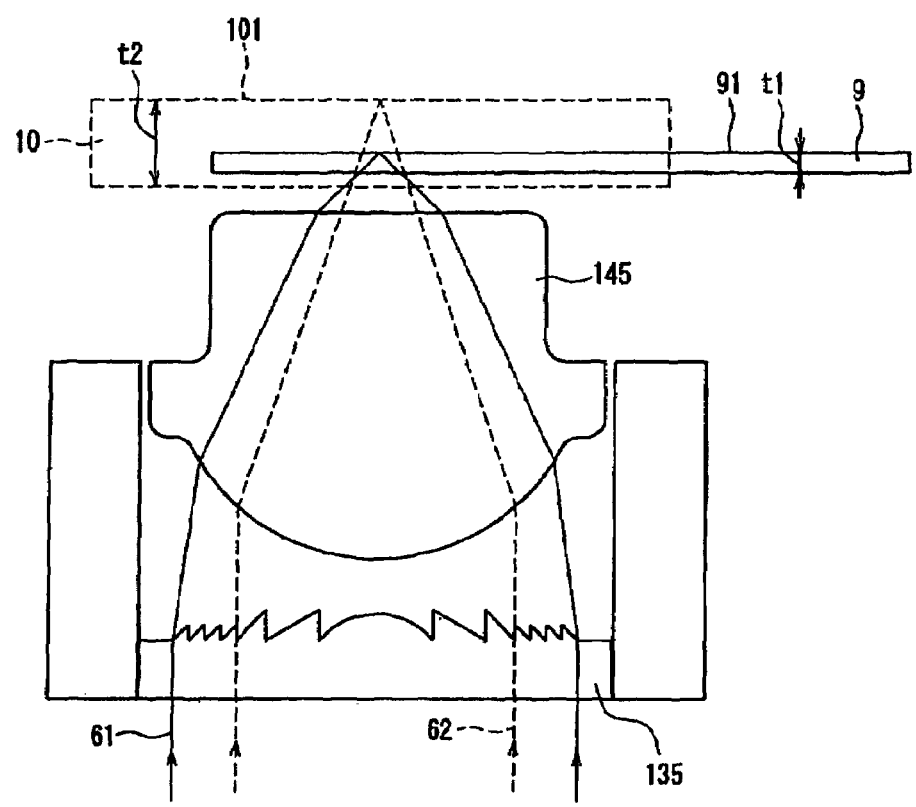
FIG. 10 is a schematic cross-sectional view showing main portions of an optical head apparatus according to an embodiment of the present invention.
Figure 11A:
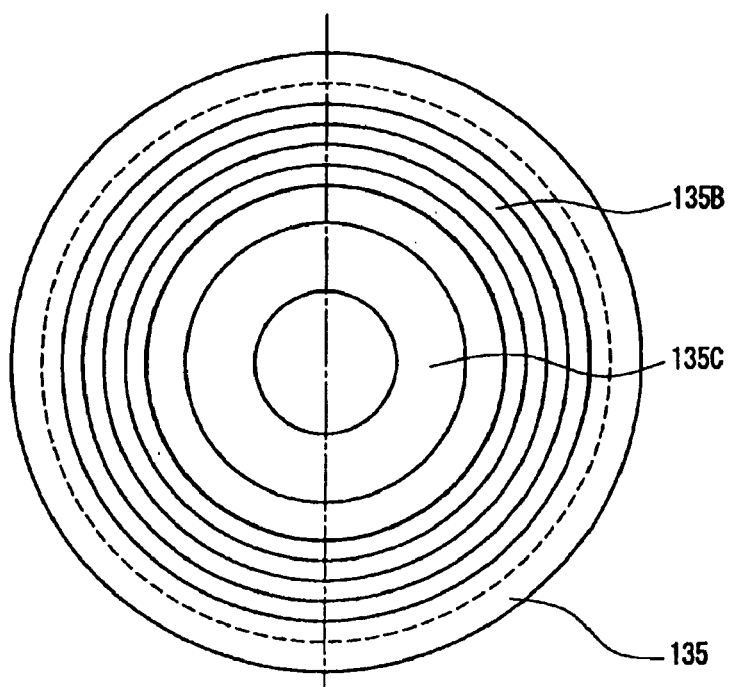
FIG. 11A is a plan view of a hologram according to an embodiment of the present invention.
Figure 11B:
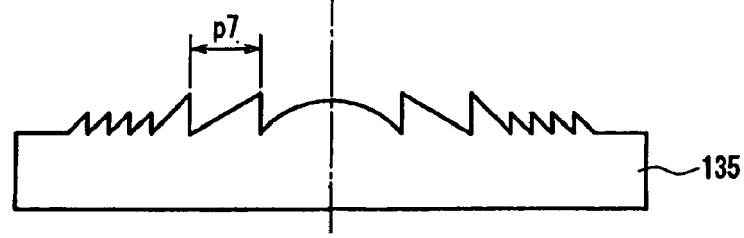
FIG. 11B is a cross-sectional view thereof.
Figure 12A:
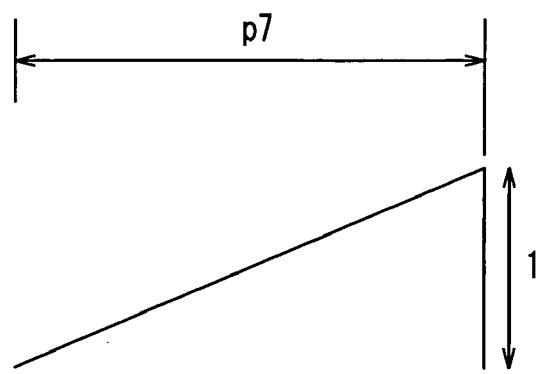
FIG. 12A is a schematic cross-sectional view showing main portions of a diffraction grating according to an embodiment of the present invention.
Figure 12B:
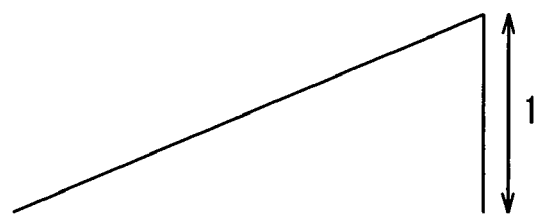
FIGS. 12B and 12C illustrate a phase change.
Figure 12C:

In FIGS. 10, and 11A–11B, reference numeral 135 denotes a hologram. An inner circumferential portion 135C is, for example, the same as the inner circumferential portion 134C of the hologram 134 shown in Embodiment 1. FIGS. 12A–12C illustrate a cross-section in one period (p7) of a hologram grating in an outer circumferential portion 135B of the hologram 135. FIG. 12A shows a physical shape. FIG. 12B shows a phase modulation amount with respect to blue light. FIG. 12C shows a phase modulation amount with respect to red light.

In FIG. 12A, a vertical direction represents a height of a sawtooth shape. A height h3 of the sawtooth shape is set so that the difference in optical path length is about one wavelength with respect to a blue light beam (i.e., the phase difference is about $2\pi$ radian). Assuming that the refractive index of a hologram material with respect to a blue light beam is nb, in the case where the hologram material is BK7, nb=1.5302, and the height h3 of the sawtooth shape grating is represented as follows:

$$h3=\lambda 1/(nb-1)/=0.764 \ \mu m$$

On the other hand, assuming that the refractive index of a hologram material with respect to a red light beam is nr, in the case where the hologram material is BK7, nr is 1.5142. The difference in optical path length occurring in a red light beam due to the level difference with the height h3 is represented by $h3\times(nr-1)$. Thus, $\lambda 2=660$ nm and nr=1.5142 are substituted into this expression, whereby the multiple of the difference in optical path length with respect to the wavelength $\lambda 2$ of the red light beam is as follows.

$$h3\times(nr-1)/\lambda 2=0.595$$

More specifically, the difference in optical path length is about 0.6 times the wavelength $\lambda 2$, and the phase modulation amount is about 1.2 $\pi$ radian. Thus, the intensity of +1st-order diffracted light becomes highest, and a calculated diffraction efficiency is about 60%.

Therefore, when the shape of a grating in one period is set to be a sawtooth cross-sectional shape with a height h3, as shown in FIG. 12A, since +1st-order diffraction becomes highest in the blue light beam (in Embodiments 1 and 2, the intensity of +2nd-order diffracted light is highest in the outer circumferential portion, which is different from the present embodiment), the grating period determining a diffraction angle is substantially p7, and a phase change is equal to that shown in FIG. 12B. Since +1st-order diffraction is highest in the red light beam, the grating period determining a diffraction angle also is substantially p7.

The outer circumferential portion 135B of the hologram 135 is designed so that a blue light beam is condensed through a substrate thickness of about 0.1 mm. At this time, a red light beam also is subjected to diffraction of the same order as that of the blue light beam (i.e., +1st-order diffraction), and the wavelength $\lambda 2$ of the red light beam is larger than the wavelength $\lambda 1$ of the blue light beam, so that the diffraction angle of the red light beam is increased.

The blazing direction of the hologram is designed so as to have a convex lens function in the same way as in the inner circumferential portion.

At this time, the diffraction angle of the red light beam is larger than that of the blue light beam, so that the red light beam is subjected to a stronger convex lens function. This is different from the following: the red light beam is subjected to a weaker convex lens function than that of the blue light beam in the inner circumferential portion (e.g., 134C), or the red light beam is subjected to a concave lens function than that of the blue light beam (131C, etc.).

Therefore, the red light beam diffracted in the outer circumferential portion 135B and the red light beam passing through the inner circumferential portion are not condensed onto the same position. Thus, a numerical aperture NAr for recording/reproducing information with respect to the optical disk 9 with the blue light beam is larger than a numerical aperture NAr for recording/reproducing information with respect to the optical disk 10 with the red light beam (NAb>NAr).

A spherical aberration due to a chromatic aberration can be corrected in combination with the steps causing a difference in optical path length that is five times the wavelength with respect to the blue light beam in a similar manner to that of Embodiment 1.

Furthermore, as an entire configuration of the optical head apparatus, it also is possible to combine the configuration that has been additionally described in Embodiment 1.

Embodiment 4

Figure 13:
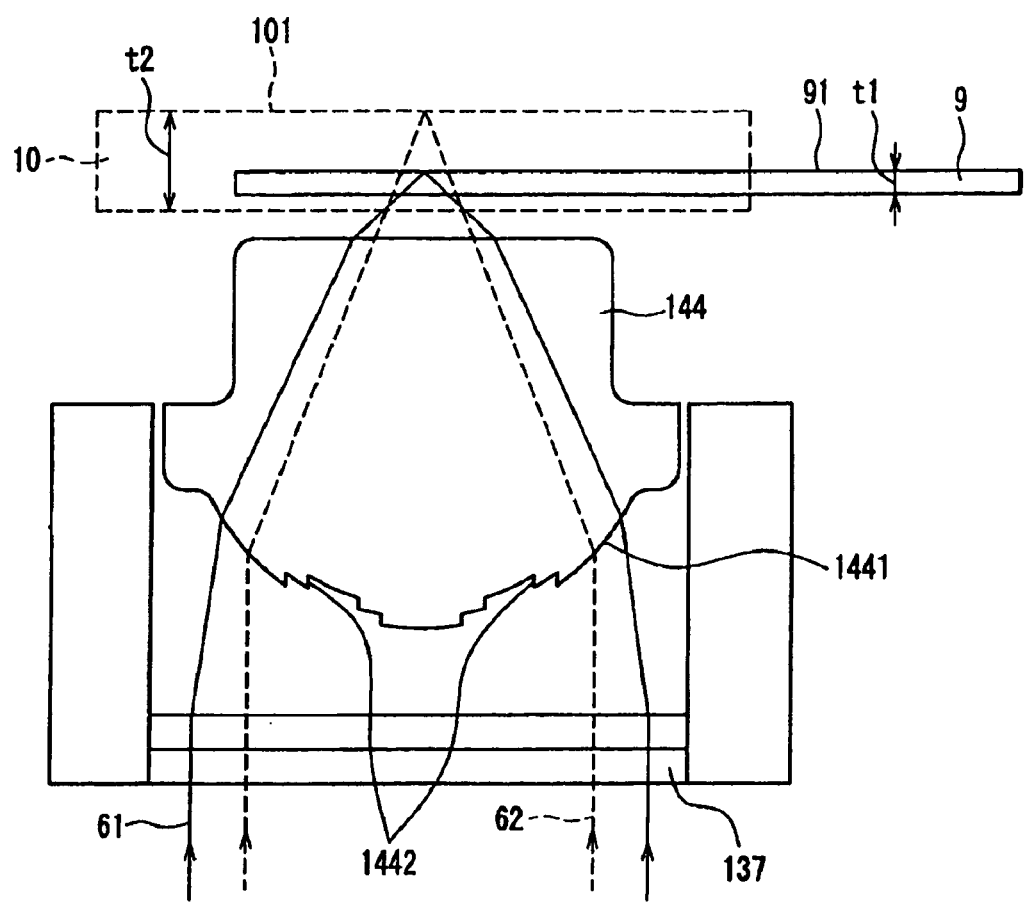
FIG. 13 is a schematic cross-sectional view showing main portions of an optical head apparatus according to an embodiment of the present invention.

FIG. 13 is a schematic cross-sectional view showing main portions of an optical head apparatus according to Embodiment 3 of the present invention. The optical head apparatus shown in FIG. 13 corresponds to the configuration shown in FIG. 5 in which a liquid crystal phase modulation element is used in place of the hologram 134.

The liquid crystal phase modulation element 137 can be switched on/off by the application of a voltage. More specifically, by electrically switching the liquid crystal phase modulation element 137, a phase modulation amount to be given to a transmission wavefront is switched to correct an aberration due to a difference in substrate thickness.

In this case, in the liquid crystal phase modulation element 137, aberrations (including an axial chromatic aberration and a spherical aberration) caused by a change in wavelength cannot be corrected. Therefore, by combining a phase level difference 1442 with the liquid crystal phase modulation element 137, chromatic aberrations including an axial chromatic aberration and a spherical aberration are corrected.

The phase level difference 1442 has the same configuration as that of the phase level difference 1442 shown in FIG. 5, in which a unit step causes a difference in optical path length of $5\lambda 1$ with respect to blue light having a wavelength $\lambda 1$ and a difference in optical path length of $3\lambda 2$ with respect to red light having a wavelength of $\lambda 2$.

For example, if one phase step is formed every time the objective lens 144 causes an aberration of 5 nm that is five times a fluctuation of a blue light wavelength of 1 nm, a chromatic aberration with respect to blue light can be corrected. Regarding red light, a chromatic aberration is caused in the same direction, so that such an aberration can be corrected similarly.

Embodiment 5

Figure 14:
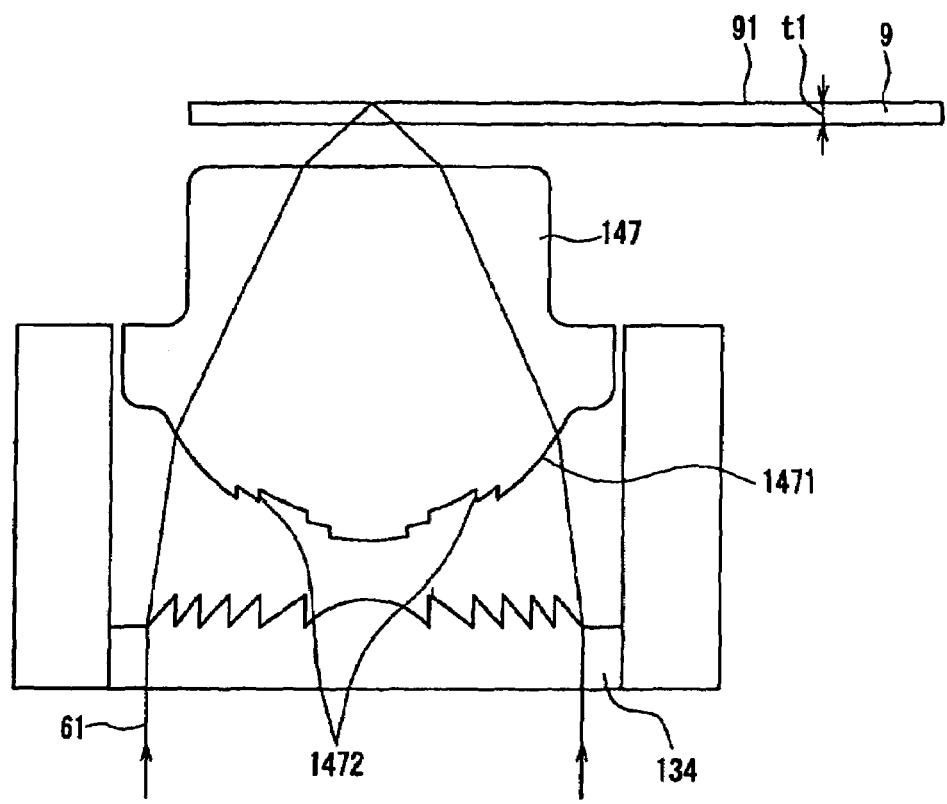
FIG. 14 is a schematic cross-sectional view showing main portions of an optical head apparatus according to an embodiment of the present invention.

FIG. 14 shows a schematic cross-sectional view showing main portions of an optical head apparatus according to Embodiment 5 of the present invention. In Embodiments 1 to 4, a phase level difference using, as a unit step, those which cause a phase difference that is five times the wavelength $\lambda 1$ of blue light is combined with a diffractive hologram or a liquid crystal phase modulation element. The present embodiment is predicated on recording/reproducing of a single optical disk. Therefore, one step of the phase level difference is not limited to a step causing a phase difference that is five times the wavelength, but is set to be a step causing a phase difference that is an integral multiple of the wavelength.

The optical head apparatus shown in FIG. 14 has a configuration in which an objective lens 147 with a phase level difference 1472 formed thereon is combined with a hologram 134. The same components as those in the optical head apparatus shown in FIG. 5 are denoted with the same reference numerals as those therein. The optical head apparatus shown in FIG. 5 records/reproduces information with respect to the optical disk 9 at the wavelength $\lambda 1$ of blue light, and a unit step of the phase level difference 1472 formed on a surface 1471 of the objective lens 147 causes a phase difference that is an integral multiple of the wavelength $\lambda 1$.

In this configuration, the chromatic aberration can be corrected. Furthermore, the correction of a chromatic aberration can be shared by the hologram 134 and the phase level difference 1472. Therefore, the grating pitch of the hologram 134 can be made rough, which enhances a light use efficiency.

Embodiment 6

Figure 15:
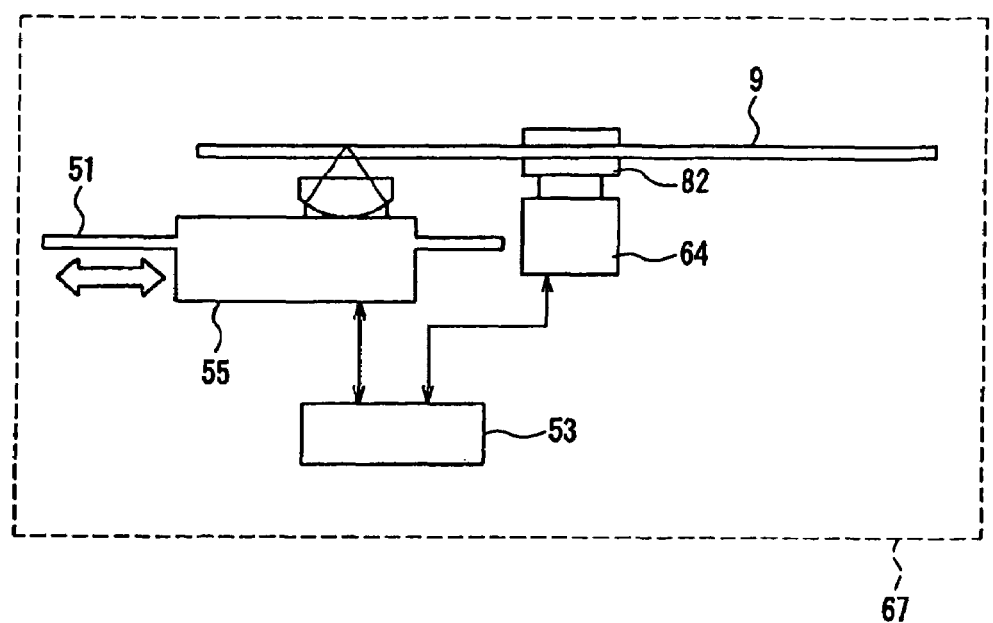
FIG. 15 is a schematic cross-sectional view of an optical information apparatus according to an embodiment of the present invention.

FIG. 15 shows an embodiment of an optical information apparatus using an optical head apparatus of the present invention. In FIG. 15, an optical disk 9 is placed on a turntable 82, and rotated by a motor 64. An optical head apparatus 55 as described in Embodiments 1 to 4 is moved to the general area of a track of the optical disk 9 where desired information is present, by a driving apparatus 51 of the optical head apparatus 55.

The optical head apparatus 55 sends a focus error signal and a tracking error signal to an electric circuit 53 in response to the positional relationship with the optical disk 9. The electric circuit 53 sends a signal for finely moving an objective lens to the optical head apparatus 55 in response to these signals. Based on these signals, the optical head apparatus 55 performs focus control and tracking control with respect to the optical disk 9, and the optical head apparatus 55 reads, writes (records), or erases information.

The above description similarly applies to the case where the optical disk 9 is replaced by an optical disk 10 having a larger substrate thickness. The optical information apparatus of the present embodiment uses the optical head apparatus of the present invention. Therefore, the optical information apparatus of the present invention can handle a plurality of optical disks having different recording densities by a single optical head apparatus.

The optical head apparatus 55 may be designed to be specific for a single optical disk as in Embodiment 5. This also applies to the following Embodiments 7 to 10.

Embodiment 7

Figure 16:
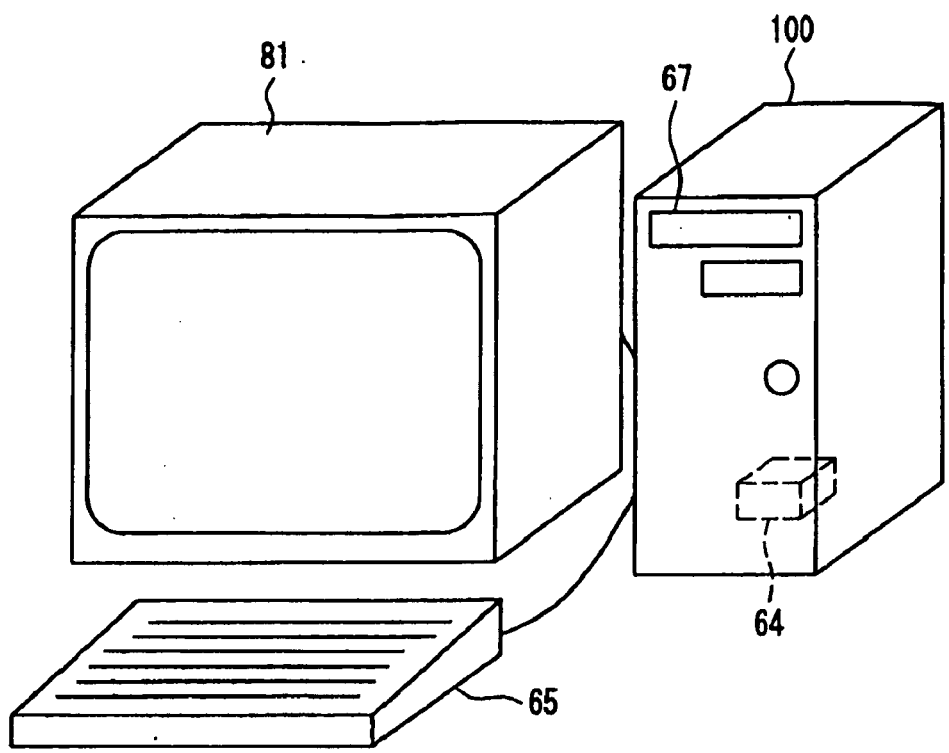
FIG. 16 is a schematic perspective view of a computer according to an embodiment of the present invention.

Embodiment 7 is directed to a computer provided with an optical information apparatus as described in Embodiment 6. FIG. 16 is a perspective view of a computer of the present embodiment.

A computer 100 shown in FIG. 16 includes an optical information apparatus 67 of Embodiment 6, an input apparatus 65 such as a keyboard mouse or a touch panel for inputting information, a computation apparatus 64 such as a central processing unit (CPU) for performing computation based on information input from the input apparatus 65 and information read from the optical information apparatus 67, and an output apparatus 81 such as a cathode-ray tube, a liquid crystal display apparatus, or a printer for displaying information such as results obtained by the computation in the computation apparatus 64.

The computer according to the present embodiment includes the optical information apparatus 67 of Embodiment 6, and can stably record/reproduce information with respect to different kinds of optical disks. Therefore, the computer according to the present embodiment can be used in a wide range.

Embodiment 8

Figure 17:
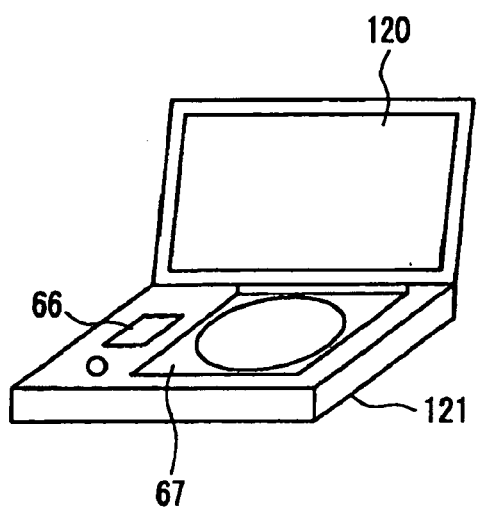
FIG. 17 is a schematic perspective view of an optical disk player according to an embodiment of the present invention.

Embodiment 8 is directed to an optical information medium (optical disk) player provided with the optical information apparatus 67 of Embodiment 6. FIG. 17 is a perspective view showing an optical information medium player of the present embodiment.

An optical disk player 121 shown in FIG. 17 includes the optical information apparatus 67 of Embodiment 6 and a converter 66 (e.g., a decoder) for converting an information signal obtained from the optical information apparatus 67 to an image. This configuration also can be used as a car navigation system. Furthermore, a display apparatus 120 such as a liquid crystal monitor also can be added.

The optical information medium player according to the present embodiment includes the optical information apparatus 67 of Embodiment 6, and can stably record/reproduce information with respect to different kinds of optical disks. Therefore, the optical information medium player according to the present embodiment can be used in a wide range.

Embodiment 9

Figure 18:
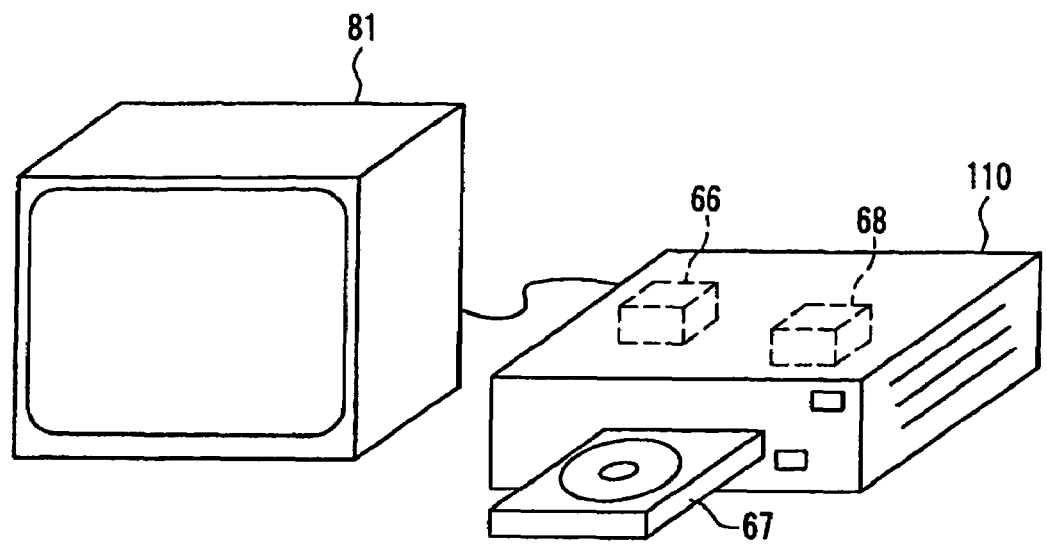
FIG. 18 is a schematic perspective view of an optical disk recorder (or a car navigation system) according to an embodiment of the present invention.

Embodiment 9 is directed to an optical information medium (optical disk) recorder provided with the optical information apparatus 67 of Embodiment 6. FIG. 18 is a perspective view showing an optical disk recorder according to the present embodiment.

An optical disk recorder 110 shown in FIG. 18 includes the optical information apparatus 67 of Embodiment 6, and a converter 68 (e.g., an encoder) for converting image information to information to be recorded onto an optical disk by the optical information apparatus 67.

It also is preferable that the converter 66 (decoder) for converting an information signal obtained from the optical information apparatus 67 to an image is provided. According to this configuration, a portion that has been recorded can be reproduced. The optical disk recorder 110 also may be provided with the output apparatus 81 such as a cathode-ray tube, a liquid crystal display apparatus, or a printer for displaying information.

The optical disk recorder of the present embodiment includes the optical information apparatus 67 of Embodiment 6, and can stably record/reproduce information with respect to different kinds of optical disks. Therefore, the optical disk recorder according to the present embodiment can be used in a wide range.

Embodiment 10

Figure 19:
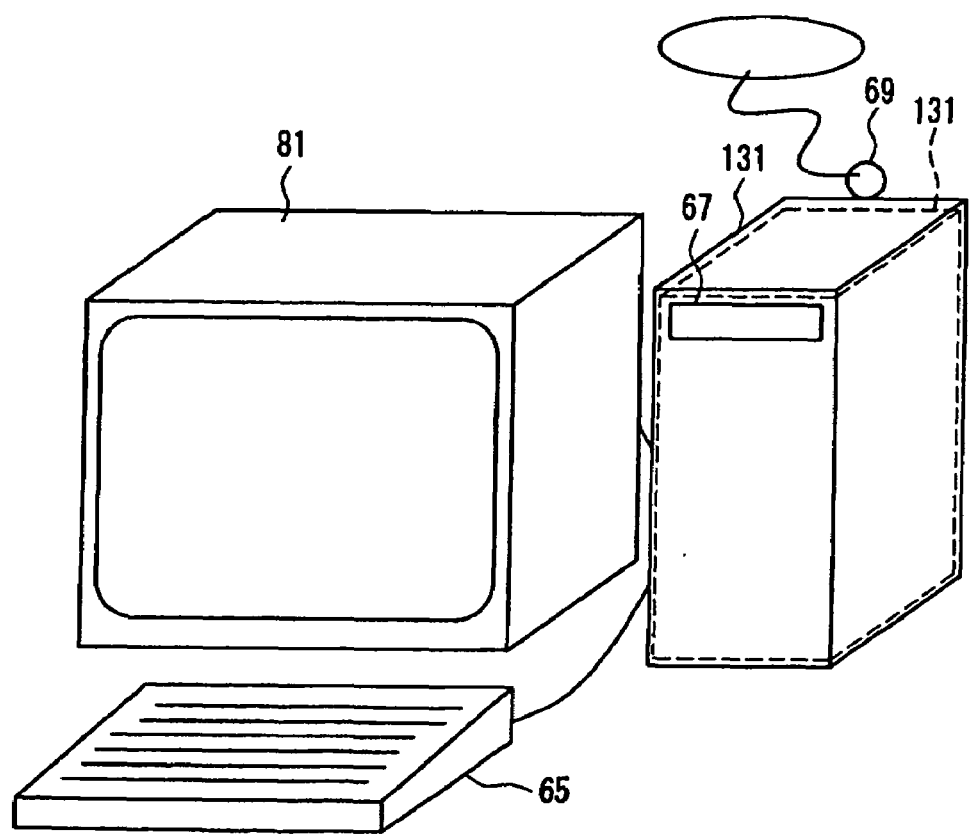
FIG. 19 is a schematic perspective view of an optical disk server according to an embodiment of the present invention.
Figure 20:
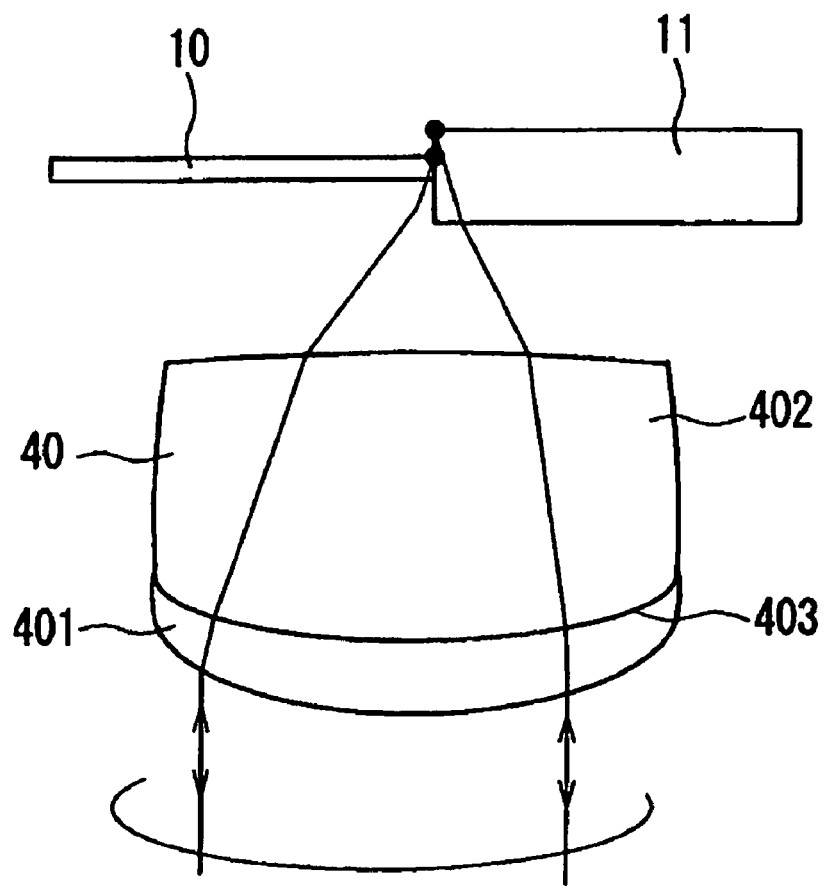
FIG. 20 is a schematic cross-sectional view showing exemplary main portions of a conventional optical head apparatus.
Figure 21:
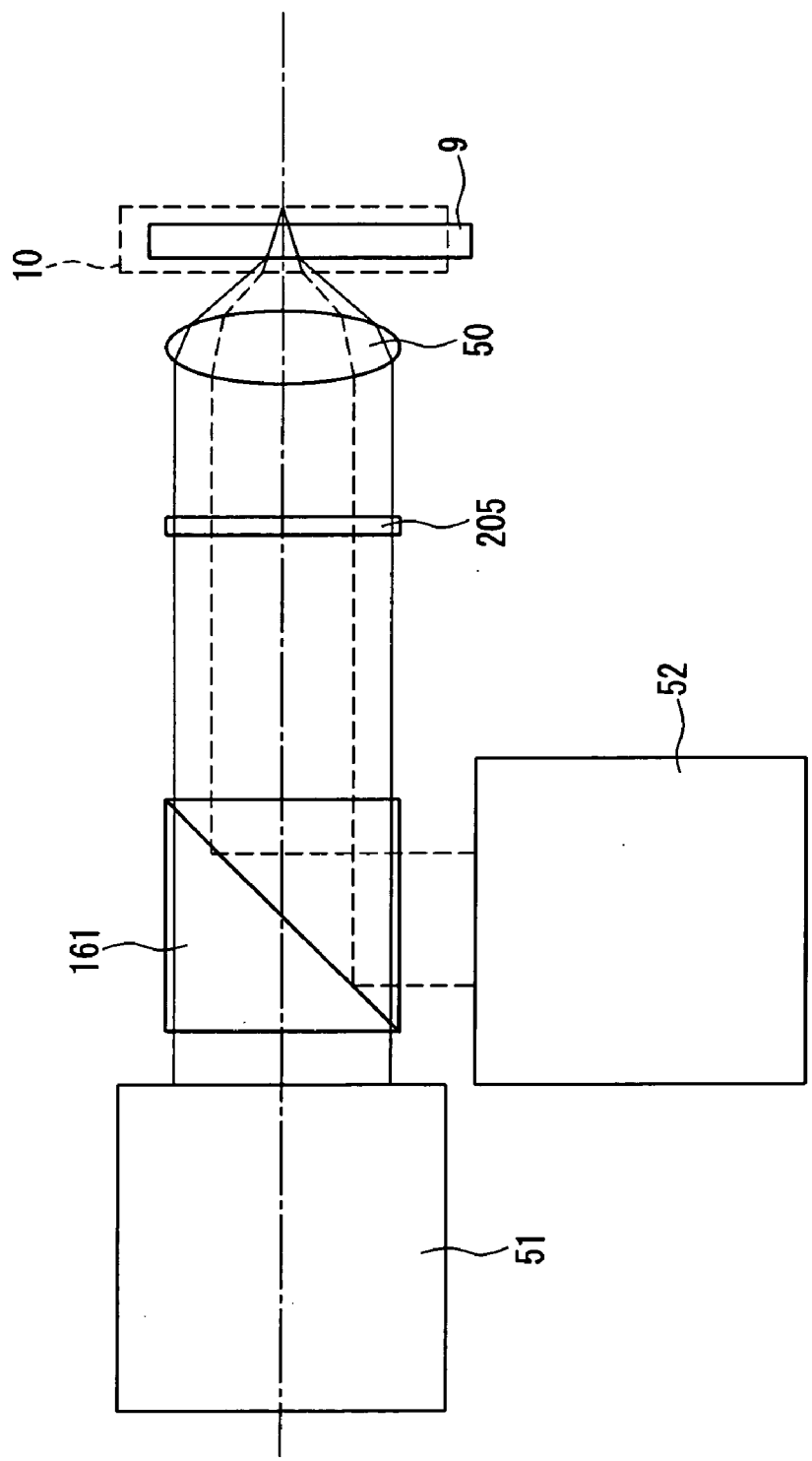
FIG. 21 is a schematic cross-sectional view of a conventional exemplary optical head apparatus.
Figure 22A:
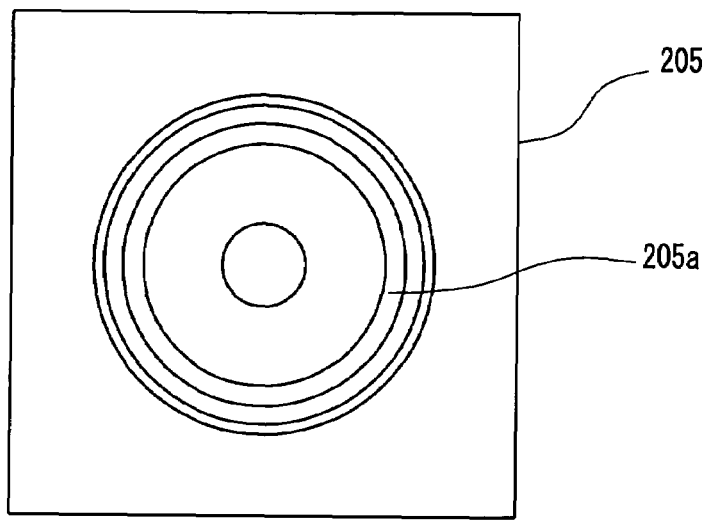
FIG. 22A is a plan view of a conventional exemplary hologram.
Figure 22B:
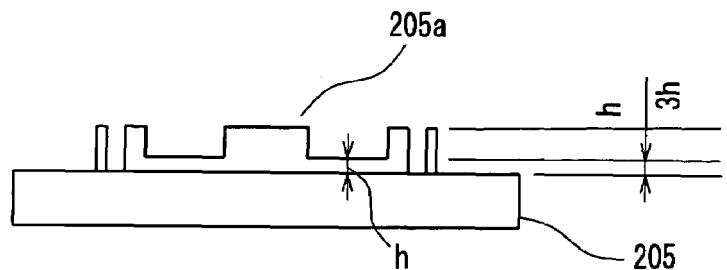
FIG. 22B is a cross-sectional view thereof.

Embodiment 10 is directed to an optical information apparatus provided with the optical information apparatus 67 of Embodiment 6. FIG. 19 is a perspective view showing an optical information apparatus according to the present embodiment.

The optical information apparatus shown in FIG. 19 includes the optical information apparatus 67 of Embodiment 6. Reference numeral 69 denotes a wired or wireless input/output terminal for obtaining information to be recorded in the optical information apparatus 67 and outputting information read by the optical information apparatus 67 to the outside. Because of this, the optical information apparatus can communicate information with the network, i.e., a plurality of devices such as a computer, a telephone, a TV tube, and the like, and can be used as a common information server (optical information medium (optical disk) server) by these plurality of devices. The optical information apparatus may be provided with an output apparatus 81 such as a cathode-ray tube, a liquid crystal display apparatus, or a printer for displaying information.

The optical information apparatus according to the present embodiment includes the optical information apparatus 67 of Embodiment 6, and can stably record/reproduce information with respect to different kinds of optical disks. Therefore, the optical information apparatus according to the present embodiment can be used in a wide range.

Furthermore, when the optical information apparatus includes a changer 131 for loading/unloading a plurality of optical disks with respect to the optical information apparatus 67, the optical information apparatus can record/store much more information.

In Embodiments 7 to 10, the output apparatus 81 and the liquid crystal apparatus 120 are shown in FIGS. 16–19. However, an output terminal may be provided instead of providing the output apparatus 81 and the liquid crystal apparatus 12 so that they are optionally available.

Furthermore, although an input apparatus is not shown in FIGS. 17 and 18, an input apparatus such as a keyboard 65 a touch panel, a mouse, a remote control apparatus, or the like may be provided. On the other hand, in Embodiments 7 to 10, an input apparatus may be optionally available, and only an input terminal may be provided.

As described above, according to the present invention, compatible reproducing/recording of different kinds of optical disks is realized with a single objective lens, and information can be reproduced or recorded stably while the change in focal length and the generation of a spherical aberration are suppressed at a time of a change in wavelength caused by switching of a light amount. Therefore, the present invention is useful for an optical head apparatus, an optical information apparatus, a computer, an optical information medium player, a car navigation system, an optical information medium recorder, and an optical information medium server.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical element designed for at least two wavelengths of red light and blue light, comprising a phase level difference, wherein a difference in optical path length occurring when the blue light passes through the phase level difference is five times the wavelength of the blue light, and a difference in optical path length occurring when the red light passes through the phase level difference is three times the wavelength of the red light.

2. An optical lens designed for at least two wavelengths of red light and blue light, comprising a phase level difference, wherein a difference in optical path length occurring when the blue light passes through the phase level difference is five times the wavelength of the blue light, and a difference in optical path length occurring when the red light passes through the phase level difference is three times the wavelength of the red light.

3. The optical lens according to claim 2, which is a refractive lens formed of two kinds of different materials.

4. The optical lens according to claim 2, further comprising a liquid crystal phase modulation element, wherein the blue light is condensed through the substrate having the thickness t1 and the red light is condensed through the substrate having the thickness t2 by electrically switching the liquid crystal phase modulation element, and an aberration due to a difference in substrate thickness is corrected by switching a phase modulation amount given to a transmission wavefront.

5. The optical lens according to claim 2, further comprising a hologram, wherein +2nd-order diffracted light is most strongly generated with respect to blue light and +1st-order diffracted light is most strongly generated with respect to red light by setting a height of a diffraction grating of the hologram, whereby an aberration due to a difference in substrate thickness is corrected.

6. An optical head apparatus, comprising:
the optical lens of claim 2;
a first laser light source for emitting blue light having a wavelength $\lambda 1$;
a second laser light source for emitting red light having a wavelength $\lambda 2$; and
a photodetector for receiving a light beam reflected from a recording surface of an optical information medium and outputting an electric signal in accordance with a light amount of the light beam.

7. The optical head apparatus according to claim 6, wherein when the second light beam is condensed onto the recording surface of the second optical information medium, a collimator lens for substantially collimating the second light beam is placed close to the second laser light source, whereby the second light beam formed into diffused light is allowed to be incident upon the optical lens, and a focal position on the second optical information medium side is placed away from the optical lens.

8. The optical head apparatus according to claim 6, wherein both light emission points of the first laser light source and the second laser light source are placed so as to have an image forming relationship with respect to a focal position on the optical information medium side of the optical lens, whereby a servo signal from a common photodetector is detected.

9. The optical head apparatus according to claim 6, wherein the optical lens condenses a first light beam from the first laser light source onto a recording surface of a first optical information medium through a substrate having a thickness t1, and condenses a second light beam from the second laser light source onto a recording surface of a second optical information medium through a substrate having a thickness t2, and t1<t2.

10. An optical information apparatus, comprising:
an optical head apparatus including the optical lens of claim 2 and a laser light source;
a motor for rotating an optical information medium; and
an electric circuit for receiving a signal obtained from the optical head apparatus, and controlling and driving at least one of the motor, the optical lens, and the laser light source based on the signal.

11. The optical information apparatus according to claim 10, wherein the laser light source includes a first laser light source for emitting blue light having a wavelength $\lambda 1$ and a second laser light source for emitting red light having a wavelength $\lambda 2$, and
the type of the optical information medium is determined, and a collimator lens is moved to the second laser light source with respect to an optical information medium having a substrate thickness of about 0.6 mm.

12. A computer comprising:
the optical information apparatus of claim 10;
a computation apparatus for performing computation based on at least one of input information and information reproduced by the optical information apparatus; and
an output apparatus for outputting at least one of the input information, the information reproduced by the optical information apparatus, and a result obtained by the computation in the computation apparatus.

13. An optical information medium player comprising the optical information apparatus of claim 10, and a decoder for converting an information signal obtained by the optical information apparatus to an image.

14. A car navigation system comprising the optical information apparatus of claim 10, and a decoder for converting an information signal obtained by the optical information apparatus to an image.

15. An optical information medium recorder comprising the optical information apparatus of claim 10, and an encoder for converting image information to information to be recorded by the optical information apparatus.

16. An optical information medium server comprising the optical information apparatus of claim 10, and an input/output terminal for exchanging information with an outside.

17. The optical lens according to claim 10, wherein a hologram grating is further formed in an outer circumferential portion outside the inner circumferential portion,
the hologram grating in the outer circumferential portion is a sawtooth shape grating having a sawtooth shape in cross-section, a height of the sawtooth shape grating in the outer circumferential portion is h3, and h3 provides a difference in optical path length of about one wavelength with respect to the blue light, and
in the outer circumferential portion, +1st-order diffracted light is generated most strongly with respect to the blue light, and +1st-order diffracted light is generated most strongly with respect to the red light.

18. The optical lens according to claim 2, wherein the blue light is condensed by the optical lens through a substrate having a thickness t1, the red light is condensed by the optical lens through a substrate having a thickness t2, and t1<t2.

19. An optical lens comprising a hologram, a refractive lens, and a phase level difference,
wherein the hologram includes a sawtooth shape grating having a sawtooth shape in cross-section, and generates +2nd-order diffracted light most strongly with respect to blue light and generates +1st-order diffracted light most strongly with respect to red light, by setting a height of the sawtooth shape grating, and
a difference in optical path length occurring when the blue light passes through the phase level difference is five times a wavelength of the blue light.

20. The optical lens according to claim 19, wherein the height of the sawtooth shape grating is h1, and h1 provides a difference in optical path length of about two wavelengths with respect the blue light.

21. The optical lens according to claim 19, wherein, in the hologram, a height of the sawtooth shape grating formed in an inner circumferential portion including an intersection with an optical axis of the hologram is h2, and h2 provides a difference in optical path length of about one wavelength with respect to the red light.

22. The optical lens according to claim 19, wherein the sawtooth shape grating is formed in an inner circumferential portion at least including an intersection with an optical axis of the hologram, +2nd-order diffracted light of the blue light is condensed through a substrate having a thickness t1, +1st-order diffracted light of the red light passing through the inner circumferential portion is condensed through a substrate having a thickness t2, and t1<t2.

23. The optical lens according to claim 22, wherein a sawtooth shape grating is further formed in an outer circumferential portion outside of the inner circumferential portion, a height of the sawtooth shape grating in the outer circumferential portion is h3, h3 provides a difference in optical path length of about one wavelength with respect to the blue light, +1st-order diffracted light is generated most strongly with respect to the blue light and +1st-order diffracted light also is generated most strongly with respect to red light, in the outer circumferential portion.

24. The optical lens according to claim 19, wherein the blue light is condensed through a substrate having a thickness t1, and the hologram is formed into a convex lens type so as to reduce a change in focal length when a wavelength λ1 of the blue light is changed, whereby the blue light is subjected to a convex lens function by the hologram.

25. The optical lens according to claim 19, wherein the blue light is condensed through a substrate having a thickness t1 by the optical lens, the red light is condensed through a substrate having a thickness t2, t1<t2, and
when the blue light is condensed through the substrate having a thickness t1, a convex lens function of the hologram is increased, compared with a case where the red light is condensed through the substrate having a thickness t2, and a focal position of the red light on the substrate side is placed farther away from the optical lens, compared with a focal position of the blue light on the substrate side.

26. The optical lens according to claim 19, wherein the blue light is condensed through a substrate having a thickness t1 by the optical lens, the red light is condensed through a substrate having a thickness t2, t1<t2, and
when the red light is condensed through the substrate having a thickness t2, a convex lens function of the hologram is decreased, compared with a case where the blue light is condensed through the substrate having a thickness t1, and a focal position of the red light on the substrate side is placed farther away from the optical lens, compared with a focal position of the blue light on the substrate side.

27. The optical lens according to claim 19, wherein a grating cross-sectional shape of the hologram is a sawtooth shape having an inclined surface on an outer circumferential side of a substrate on which the hologram is formed.

28. The optical lens according to claim 19, wherein the hologram, the refractive lens, and the phase level difference are fixed integrally.

29. The optical lens according to claim 19, wherein the hologram is integrally formed on a surface of the refractive lens.

30. The optical lens according to claim 19, wherein the phase level difference is integrally formed on a surface of the refractive lens.

31. The optical lens according to claim 19, wherein an aberration occurring in a refractive lens, or a refractive lens and a hologram due to a change in wavelength is reduced by an aberration occurring in the phase level difference.

32. The optical lens according to claim 19, wherein assuming that a numerical aperture at which the blue light is condensed through a substrate having a thickness t1 is NAb, and a numerical aperture at which the red light is condensed through a substrate having a thickness t2 is NAr, t1<t2 and NAb>NAr.

33. An optical head apparatus, comprising:
the optical lens of claim 19;
a first laser light source for emitting blue light having a wavelength λ1;
a second laser light source for emitting red light having a wavelength λ2; and
a photodetector for receiving a light beam reflected from a recording surface of an optical information medium and outputting an electric signal in accordance with a light amount of the light beam.

34. The optical head apparatus according to claim 33, wherein the optical lens condenses a first light beam from the first laser light source onto a recording surface of a first optical information medium through a substrate having a thickness t1, and condenses a second light beam from the second laser light source onto a recording surface of a second optical information medium through a substrate having a thickness t2, and t1 >t2.

35. An optical information apparatus, comprising:
an optical head apparatus including the optical lens of claim 19 and a laser light source;
a motor for rotating an optical information medium; and
an electric circuit for receiving a signal obtained from the optical head apparatus, and controlling and driving at least one of the motor, the optical lens, and the laser light source based on the signal.

36. A computer comprising:
the optical information apparatus of claim 31;
a computation apparatus for performing computation based on at least one of input information and information reproduced by the optical information apparatus; and
an output apparatus for outputting at least one of the input information, the information reproduced by the optical information apparatus, and a result obtained by the computation in the computation apparatus.

37. An optical information medium player comprising the optical information apparatus of claim 35, and a decoder for converting an information signal obtained by the optical information apparatus to an image.

38. A car navigation system comprising the optical information apparatus of claim 35, and a decoder for converting an information signal obtained by the optical information apparatus to an image.

39. An optical information medium recorder comprising the optical information apparatus of claim 35, and an encoder for converting image information to information to be recorded by the optical information apparatus.

40. An optical information medium server comprising the optical information apparatus of claim 35, and an input/output terminal for exchanging information with an outside.

41. An optical lens comprising a hologram, a refractive lens, and a phase level difference,
  wherein the hologram generates +2nd-order diffracted light most strongly with respect to blue light and generates +1st-order diffracted light most strongly with respect to red light,
  a hologram grating of the hologram is formed in an inner circumferential portion at least including an intersection with an optical axis of the hologram,
  +2nd-order diffracted light of the blue light is condensed through a substrate having a thickness t1, and +1st-order diffracted light of the red light passing through the inner circumferential portion is condensed through a substrate having a thickness t2, and t1<t2, and
  a difference in optical path length occurring when the blue light passes through the phase level difference is five times a wavelength of the blue light.

42. An optical head apparatus, comprising:
  the optical lens of claim 41;
  a first laser light source for emitting blue light having a wavelength $\lambda 1$;
  a second laser light source for emitting red light having a wavelength $\lambda 2$; and
  a photodetector for receiving a light beam reflected from a recording surface of an optical information medium and outputting an electric signal in accordance with a light amount of the light beam.

43. The optical head apparatus according to claim 42, wherein the optical lens condenses a first light beam from the first laser light source onto a recording surface of a first optical information medium through a substrate having thickness t1, and condenses a second light beam from the second laser light source onto a recording surface of a second optical information medium through a substrate having a thickness t2, and t1 >t2.

* * * * *

UNITED STATES PATENT AND TRADEMARK OFFICE
CERTIFICATE OF CORRECTION

PATENT NO. : 7,248,409 B2  Page 1 of 1
APPLICATION NO. : 10/716990
DATED : July 24, 2007
INVENTOR(S) : Komma et al.

It is certified that error appears in the above-identified patent and that said Letters Patent is hereby corrected as shown below:

Column 27, line 18 (claim 20): "with respect the blue light" should read --with respect to the blue light--.

Signed and Sealed this

Twenty Second Day of April, 2008

JON W. DUDAS
*Director of the United States Patent and Trademark Office*